US012238774B2

(12) United States Patent
Baron et al.

(10) Patent No.: US 12,238,774 B2
(45) Date of Patent: Feb. 25, 2025

(54) ENHANCED MANAGEMENT OF ACs IN MULTI-USER EDCA TRANSMISSION MODE IN WIRELESS NETWORKS

(71) Applicant: CANON KABUSHIKI KAISHA, Tokyo (JP)

(72) Inventors: Stéphane Baron, Le Rheu (FR); Patrice Nezou, Liffre (FR); Pascal Viger, Janze (FR)

(73) Assignee: Canon Kabushiki Kaisha, Tokyo (JP)

( * ) Notice: Subject to any disclaimer, the term of this patent is extended or adjusted under 35 U.S.C. 154(b) by 214 days.

(21) Appl. No.: 18/045,756

(22) Filed: Oct. 11, 2022

(65) Prior Publication Data
US 2023/0113934 A1    Apr. 13, 2023

Related U.S. Application Data

(63) Continuation of application No. 17/084,479, filed on Oct. 29, 2020, now Pat. No. 11,595,996, which is a
(Continued)

(30) Foreign Application Priority Data
Oct. 21, 2016 (GB) ..................................... 1617880

(51) Int. Cl.
*H04W 74/0816* (2024.01)
*H04L 65/80* (2022.01)
(Continued)

(52) U.S. Cl.
CPC ......... *H04W 74/0816* (2013.01); *H04L 65/80* (2013.01); *H04W 28/0268* (2013.01);
(Continued)

(58) Field of Classification Search
CPC ......... H04W 74/0816; H04W 28/0268; H04W 72/0453; H04L 65/80
See application file for complete search history.

(56) References Cited

U.S. PATENT DOCUMENTS

2018/0110069 A1* 4/2018 Zhou ................. H04W 74/0875

FOREIGN PATENT DOCUMENTS

KR    10-2011-0116978 A    10/2011

OTHER PUBLICATIONS

Chittabrata Ghosh, Location Measurement Protocol for Unassociated STAs, IEEE-SA Mentor, Sep. 13, 2016, Doc. IEEE 802.11-16/1260r0.
(Continued)

*Primary Examiner* — Mohammad S Anwar
(74) *Attorney, Agent, or Firm* — Canon U.S.A., Inc. IP Division

(57) ABSTRACT

To avoid blocking node AC queues in the degraded MU EDCA mode due to regular OFDMA transmission of data from another AC queue in resource units provided by an AP, the present invention proposes to use a dedicated HEM-UEDCATimer for each AC queue, in order for them to be able to exit the degraded MU EDCA mode independently of the other AC queues. In this respect, upon successfully transmitting data stored in two or more traffic queues, in each of one or more accessed resource units provided by the AP within one or more transmission opportunities, the node sets each traffic queue transmitting in the accessed resource unit in the degraded MU EDCA mode for a predetermined degrading duration counted down by a respective timer associated with the transmitting traffic queue. Next, upon expiry of any timer, the node switches back the associated traffic queue to the conventional EDCA mode.

17 Claims, 11 Drawing Sheets

Related U.S. Application Data continuation of application No. 16/341,868, filed as application No. PCT/EP2017/076339 on Oct. 16, 2017, now Pat. No. 10,893,539.

(51) Int. Cl.
*H04W 28/02* (2009.01)
*H04W 72/0453* (2023.01)
*H04W 72/121* (2023.01)
*H04W 74/00* (2009.01)
*H04W 84/12* (2009.01)

(52) U.S. Cl.
CPC ..... *H04W 72/0453* (2013.01); *H04W 72/121* (2013.01); *H04W 74/006* (2013.01); *H04W 84/12* (2013.01)

(56) References Cited

OTHER PUBLICATIONS

Laurent Cariou, Proposed text changes for MU EDCA parameters, IEEE 802.11-16/1180r1, IEEE mentor, Sep. 13, 2016.
Stephane Baron, Traffic priority for random Multi User Uplink OFDMA, IEEE 802.11-15/1280r0, IEEE mentor, Nov. 8, 2015.
Suhwook Kim, OFDMA performance in 11ax, IEEE 802.11-15/1095r6, IEEE mentor, Mar. 14, 2016.

\* cited by examiner

| AC | $CW_{min}$ | $CW_{max}$ | AIFSN |
|---|---|---|---|
| AC_BG | aCWmin | aCWmax | 7 |
| AC_BE | aCWmin | aCWmax | 3 |
| AC_VI | (aCWmin+1)/2-1 | aCWmin | 2 |
| AC_VO | (aCWmin+1)/4-1 | (aCWmin+1)/2-1 | 2 |

| AC | MU $CW_{min}$ | MU $CW_{max}$ | MU AIFSN |
|---|---|---|---|
| AC_BG | aCWmin | aCWmax | 14 |
| AC_BE | aCWmin | aCWmax | 10 |
| AC_VI | (aCWmin+1)/2-1 | aCWmin | 9 |
| AC_VO | (aCWmin+1)/4-1 | (aCWmin+1)/2-1 | 9 |

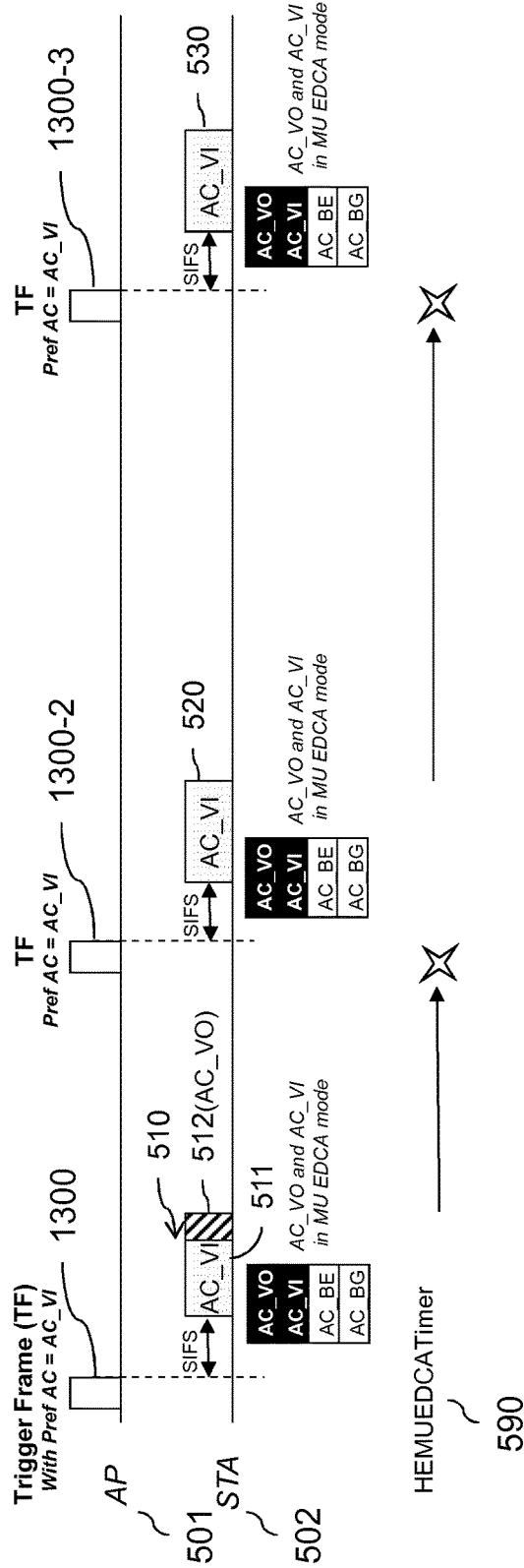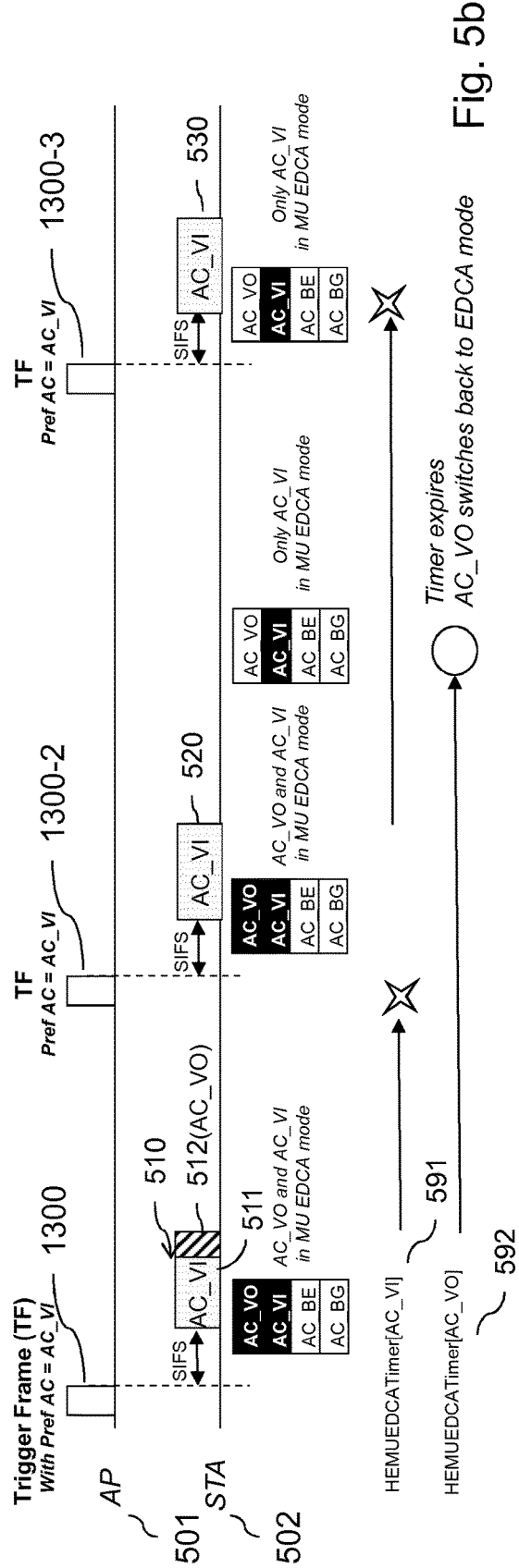
Fig. 5a
Fig. 5b

ENHANCED MANAGEMENT OF ACs IN MULTI-USER EDCA TRANSMISSION MODE IN WIRELESS NETWORKS

CROSS-REFERENCE TO RELATED APPLICATIONS

This application is a continuation of U.S. patent application Ser. No. 17/084,479, filed on Oct. 29, 2020, which is a continuation of U.S. patent application Ser. No. 16/341,868, filed on Apr. 12, 2019, now issued as U.S. Pat. No. 10,893,539 on Jan. 12, 2021, which is a National Phase application of PCT Application No. PCT/EP2017/076339, filed on Oct. 16, 2017 and titled "ENHANCED MANAGEMENT OF ACs IN MULTI-USER EDCA TRANSMISSION MODE IN WIRELESS NETWORKS." This application claims the benefit under 35 U.S.C. § 119(a)-(d) of United Kingdom Patent Application No. GB1617880.8, filed on Oct. 21, 2016. The above cited patent applications are incorporated herein by reference in their entirety.

FIELD OF THE INVENTION

The present invention relates generally to communication networks and more specifically to communication networks offering channel accesses to nodes through contention and providing secondary accesses to the nodes to sub-channels (or Resource Units) splitting a transmission opportunity TXOP granted to an access point, in order to transmit data.

The invention finds application in wireless communication networks, in particular in 802.11ax networks offering, to the nodes, an access to an 802.11ax composite channel and/or to OFDMA Resource Units forming for instance an 802.11ax composite channel granted to the access point and allowing Uplink communication to be performed.

BACKGROUND OF THE INVENTION

The IEEE 802.11 MAC standard defines the way Wireless local area networks (WLANs) must work at the physical and medium access control (MAC) level. Typically, the 802.11 MAC (Medium Access Control) operating mode implements the well-known Distributed Coordination Function (DCF) which relies on a contention-based mechanism based on the so-called "Carrier Sense Multiple Access with Collision Avoidance" (CSMA/CA) technique.

The 802.11 medium access protocol standard or operating mode is mainly directed to the management of communication nodes waiting for the wireless medium to become idle so as to try to access to the wireless medium.

The network operating mode defined by the IEEE 802.11ac standard provides very high throughput (VHT) by, among other means, moving from the 2.4 GHz band which is deemed to be highly susceptible to interference to the 5 GHz band, thereby allowing for wider frequency contiguous channels of 80 MHz to be used, two of which may optionally be combined to get a 160 MHz channel as operating band of the wireless network.

The 802.11ac standard also tweaks control frames such as the Request-To-Send (RTS) and Clear-To-Send (CTS) frames to allow for composite channels of varying and predefined bandwidths of 20, 40 or 80 MHz, the composite channels being made of one or more communication channels that are contiguous within the operating band. The 160 MHz composite channel is possible by the combination of two 80 MHz composite channels within the 160 MHz operating band. The control frames specify the channel width (bandwidth) for the targeted composite channel.

A composite channel therefore consists of a primary channel on which a given node performs EDCA backoff procedure to access the medium, and of at least one secondary channel, of for example 20 MHz each.

EDCA (Enhanced Distributed Channel Access) defines traffic categories and four corresponding access categories that make it possible to handle differently high-priority traffic compared to low-priority traffic.

Implementation of EDCA in the nodes can be made using a plurality of traffic queues (known as "Access Categories") for serving data traffic at different priorities, each traffic queue being associated with a respective queue backoff value. The queue backoff value is computed from respective queue contention parameters, e.g. EDCA parameters, and is used to contend for access to a communication channel in order to transmit data stored in the traffic queue.

Conventional EDCA parameters include $CW_{min}$, $CW_{max}$ and AIFSN for each traffic queue, wherein $CW_{min}$ and $CW_{max}$ are the lower and higher boundaries of a selection range from which an EDCA contention window CW is selected for a given traffic queue. AIFSN stands for Arbitration Inter-Frame Space Number, and defines the number of time slots (usually 9 µs), additional to a DIFS interval (the total defining the AIFS period) the node must sense the medium as idle before decrementing the queue backoff value associated with the traffic queue considered.

The EDCA parameters may be defined in a beacon frame sent by a specific node in the network to broadcast network information.

The contention windows CW and the queue backoff values are EDCA variables.

Conventional EDCA backoff procedure consists for the node to select a queue backoff value for a traffic queue from the respective contention window CW, and then to decrement it upon sensing the medium as idle after the AIFS period. Once the backoff value reaches zero, the node is allowed to access the medium.

The EDCA queue backoff values or counters thus play two roles. First, they drive the nodes in efficiently accessing the medium, by reducing risks of collisions; second, they offer management of quality of service, QoS, by mirroring the aging of the data contained in the traffic queue (the more aged the data, the lower the backoff value) and thus providing different priorities to the traffic queues through different values of the EDCA parameters (especially the AIFSN parameter that delays the start of the decrementing of the EDCA queue backoff values).

Thanks to the EDCA backoff procedure, the node can thus access the communication network using contention type access mechanism based on the queue contention parameters, typically based on the computed queue backoff counter or value.

The primary channel is used by the communication nodes to sense whether or not the channel is idle, and the primary channel can be extended using the secondary channel or channels to form a composite channel. The primary channel can also be used alone.

Given a tree breakdown of the operating band into elementary 20 MHz channels, some secondary channels are named tertiary or quaternary channels.

In 802.11ac, all the transmissions, and thus the possible composite channels, include the primary channel. This is because the nodes perform full Carrier Sense Multiple Access/Collision Avoidance (CSMA/CA) and Network Allocation Vector (NAV) tracking on the primary channel only. The other channels are assigned as secondary channels, on which the nodes have only capability of CCA (clear channel assessment), i.e. detection of an idle or busy state/status of said secondary channel.

An issue with the use of composite channels as defined in the 802.11n or 802.11ac (or 802.11ax) is that the nodes compliant with a use of composite channels (i.e. 802.11n and 802.11ac-compliant nodes or "HT nodes" standing for High Throughput nodes) have to co-exist with legacy nodes not able to use composite channels but relying only on conventional 20 MHz channels (i.e. non-HT nodes compliant only with for instance 802.11a/b/g) exist within the same wireless network, and thus have to share the same 20 MHz channels.

To cope with this issue, the 802.11n and 802.11ac and 802.11ax standards provide the possibility to duplicate control frames (e.g. RTS/CTS or CTS-to-Self or ACK frames to acknowledge correct or erroneous reception of the sent data) over each 20 MHz channel in an 802.11a legacy format (called as "non-HT") to establish a protection of the requested TXOP over the whole composite channel.

This is for any legacy 802.11a node that uses any of the 20 MHz channel involved in the composite channel to be aware of on-going communications on the 20 MHz channel. As a result, the legacy node is prevented from initiating a new transmission until the end of the current composite channel TXOP granted to an 802.11 n/ac/ax node.

As originally proposed by 802.11n, a duplication of conventional 802.11a or "non-HT" transmission is provided to allow the two identical 20 MHz non-HT control frames to be sent simultaneously on both the primary and secondary channels forming the used composite channel.

This approach has been widened for 802.11ac to allow duplication over the channels forming an 80 MHz or 160 MHz composite channel. In the remainder of the present document, the "duplicated non-HT frame" or "duplicated non-HT control frame" or "duplicated control frame" means that the node device duplicates the conventional or "non-HT" transmission of a given control frame over secondary 20 MHz channel(s) of the (40 MHz, 80 MHz or 160 MHz) operating band.

In practice, to request a composite channel (equal to or greater than 40 MHz) for a new TXOP, an 802.11n/ac node performs an EDCA backoff procedure in the primary 20 MHz channel as mentioned above. In parallel, it performs a channel sensing mechanism, such as a Clear-Channel-Assessment (CCA) signal detection, on the secondary channels to detect the secondary channel or channels that are idle (channel state/status is "idle") during a PIFS interval before the start of the new TXOP (i.e. before any queue backoff counter expires).

More recently, Institute of Electrical and Electronics Engineers (IEEE) officially approved the 802.11ax task group, as the successor of 802.11ac. The primary goal of the 802.11ax task group consists in seeking for an improvement in data speed to wireless communicating devices used in dense deployment scenarios.

Recent developments in the 802.11ax standard sought to optimize usage of the composite channel by multiple nodes in a wireless network having an access point (AP). Indeed, typical contents have important amount of data, for instance related to high-definition audio-visual real-time and interactive content. Furthermore, it is well-known that the performance of the CSMA/CA protocol used in the IEEE 802.11 standard deteriorates rapidly as the number of nodes and the amount of traffic increase, i.e. in dense WLAN scenarios.

In this context, multi-user (MU) transmission has been considered to allow multiple simultaneous transmissions to/from different users in both downlink (DL) and uplink (UL) directions from/to the AP and during a transmission opportunity granted to the AP. In the uplink, multi-user transmissions can be used to mitigate the collision probability by allowing multiple non-AP stations or nodes to simultaneously transmit.

To actually perform such multi-user transmission, it has been proposed to split a granted communication channel into sub-channels, also referred to as resource units (RUs), that are shared in the frequency domain by multiple users (non-AP stations/nodes), based for instance on Orthogonal Frequency Division Multiple Access (OFDMA) technique. Each RU may be defined by a number of tones, the 80 MHz channel containing up to 996 usable tones.

OFDMA is a multi-user variation of OFDM which has emerged as a new key technology to improve efficiency in advanced infrastructure-based wireless networks. It combines OFDM on the physical layer with Frequency Division Multiple Access (FDMA) on the MAC layer, allowing different subcarriers to be assigned to different stations/nodes in order to increase concurrency. Adjacent sub-carriers often experience similar channel conditions and are thus grouped to sub-channels: an OFDMA sub-channel or RU is thus a set of sub-carriers.

As currently envisaged, the granularity of such OFDMA sub-channels is finer than the original 20 MHz channel band. Typically, a 2 MHz or 5 MHz sub-channel may be contemplated as a minimal width, therefore defining for instance 9 sub-channels or resource units within a single 20 MHz channel.

The multi-user feature of OFDMA allows the AP to assign or offer different RUs to different non-AP stations/nodes in order to increase competition. This may help to reduce contention and collisions inside 802.11 networks.

Contrary to downlink OFDMA wherein the AP can directly send multiple data to multiple stations (supported by specific indications inside the PLCP header), a trigger mechanism has been adopted for the AP to trigger multi-user uplink (MU UL) OFDMA communications from various nodes.

To support multi-user uplink, i.e. uplink transmission to the 802.11ax access point (AP) during a pre-empted TXOP, the 802.11ax AP has to provide signalling information for the legacy nodes (non-802.11ax nodes) to set their NAV and for the 802.11ax nodes to determine the allocation of the resource units RUs provided by the AP.

The 802.11ax standard defines a trigger frame (TF) that is sent by the AP to the 802.11ax nodes to trigger Multi-User uplink communications.

The document IEEE 802.11-15/0365 proposes that a 'Trigger' frame (TF) is sent by the AP to solicit the transmission of uplink (UL) Multi-User (OFDMA) PPDU from multiple nodes. The TF defines the resource units as provided by the AP to the nodes. In response, the nodes transmit UL MU (OFDMA) PPDU as immediate responses to the Trigger frame. All transmitters can send data at the same time, but using disjoint sets of RUs (i.e. of frequencies in the OFDMA scheme), resulting in transmissions with less interference.

The bandwidth or width of the targeted composite channel is signalled in the TF frame, meaning that the 20, 40, 80 or 160 MHz value is added. The TF frame is sent over the primary 20 MHz channel and duplicated (replicated) on each other 20 MHz channels forming the targeted composite channel, if appropriate. As described above for the duplication of control frames, it is expected that every nearby legacy node (non-HT or 802.11ac nodes) receiving the TF on its primary channel, then sets its NAV to the value specified in the TF. This prevents these legacy nodes from accessing the channels of the targeted composite channel during the TXOP.

A resource unit RU can be reserved for a specific node, in which case the AP indicates, in the TF, the node to which the RU is reserved. Such RU is called Scheduled RU. The indicated node does not need to perform contention on accessing a scheduled RU reserved to it.

The type of data the node is allowed to transmit in the Scheduled RU may be specified by the AP in the TF. For instance, the TF includes a 2-bit "Preferred AC" field in which the AP indicates one of the four EDCA traffic queues. On the other hand, the AP may let the Scheduled RU be opened to any type of data. To activate or not the "Preferred AC", the TF includes another 1-bit field, namely "AC Preference Level".

In order to better improve the efficiency of the system with regards to un-managed traffic to the AP (for example, uplink management frames from associated nodes, unassociated nodes intending to reach an AP, or simply unmanaged data traffic), resource units may be proposed by the AP to the 802.11ax nodes through contention-based access. In other words, the resource unit RU can be randomly accessed by more than one node (of the group of nodes registered with the AP). Such RU is called Random RU and is indicated as such in the TF. Random RUs may serve as a basis for contention between nodes willing to access the communication medium for sending data.

An exemplary random resource selection procedure is defined in document IEEE 802.11-15/1105. According to this procedure, each 802.11ax node maintains a dedicated backoff engine, referred below to as OFDMA or RU (for resource unit) backoff engine, using RU contention parameters, including an RU backoff value, to contend for access to one of the random RUs. Once its OFDMA or RU backoff value reaches zero (it is for instance decremented at each new TF-R frame by the number of random RUs defined therein), a node becomes eligible for RU access and thus randomly selects one RU from among all the random RUs defined in the received trigger frame. It then uses the selected RU to transmit data of at least one of the traffic queues.

As readily apparent from the above, the Multi User Uplink medium access scheme (or OFDMA or RU access scheme) allows the number of collisions generated by simultaneous medium access attempts to be reduced, while also reducing the overhead due to the medium access since the medium access cost is shared between several nodes. The OFDMA or RU access scheme thus appears to be quite more efficient (with regards of the medium usage) than the conventional EDCA contention-based medium access scheme (in the context of a high density 802.11 cell).

Although the OFDMA or RU access scheme seems more efficient, the EDCA access scheme must also survive and thus coexist with the OFDMA or RU access scheme.

This is mainly due to the existence of legacy 802.11 nodes which must still have the opportunity to access the medium, while they are not aware of the OFDMA or RU access scheme. And the global fairness about the medium access must be ensured.

This is also all the more necessary that the 802.11ax nodes should also have the opportunity to gain access to the medium through conventional EDCA contention-based medium access, for instance to send data to another node (i.e. for traffic different from uplink traffic to the AP).

So the two medium access schemes, EDCA and OFDMA/RU access schemes, have to coexist.

This coexistence has downsides.

For instance, 802.11ax nodes and legacy nodes have the same medium access probability using the EDCA access scheme. However, the 802.11ax nodes have additional medium access opportunities using the MU Uplink or OFDMA or RU access scheme.

It results that access to the medium is not fully fair between the 802.11ax nodes and the legacy nodes.

To restore some fairness between the nodes, solutions have been proposed to modify, upon successfully transmitting data over an accessed resource unit (i.e. through UL OFDMA transmission), a current value of at least one queue contention parameter into a penalized or degraded value, to reduce a probability for the node to access a communication channel through (EDCA) contention. For instance, the penalized or degraded value is more restrictive than the original (or legacy) value.

For instance, document IEEE 802.11-16/1180 entitled "Proposed text changes for MU EDCA parameters" proposes that, upon successfully (MU UL OFDMA) transmitting data in a resource unit, RU, reserved by the AP, a node is set in a MU EDCA mode, for a predetermined duration counted down by a timer (noted HEMUEDCATimer below, standing for High Efficiency Multi-User EDCA Timer), in which the EDCA parameters are set to values, referred to as MU EDCA parameters values or MU values, different from legacy values used in a legacy EDCA mode. The MU parameter values are set to more restrictive values than the legacy values: more restrictive values for EDCA parameters means that a probability for a node to access the communication channel through EDCA access scheme using the MU values is reduced relatively to an access using the legacy values.

In other words, as soon as the node transmits some data from one or more traffic queues using a scheduled RU assigned to the node by the AP, the node shall modify the EDCA parameters associated with the transmitting traffic queue(s) (here below "degraded", "penalized" or "blocked" traffic queue(s)), with some special more restrictive ("MU" or "degraded") values that may be provided by the AP in a dedicated Information Element of a beacon frame, which also includes the value to be used by the nodes for their HEMUEDCATimer.

One may thus note that the AP sends, to the nodes, the more restrictive values to drive the node in modifying current values of their EDCA parameters into the MU values upon the node successfully transmitting data over the accessed resource unit. This is also to reduce a probability for the node to access the communication channel through EDCA access scheme.

In addition, the AP may determine the more restrictive values based on a history of data received from the nodes (e.g. through RUs).

The disclosed approach suggests increasing only the value of AIFSN for each transmitting traffic queue, while keeping $CW_{min}$ and $CW_{max}$ unchanged. As the corresponding AIFS period increases, the traffic queue in the MU EDCA mode is prevented (or at least substantially delayed) from having its queue backoff value or counter been decremented upon sensing the medium free, in particular in high density environment in which the medium does not remain free for a long time. New accesses to the medium using EDCA access scheme are statistically substantially reduced, or even no longer possible.

Upon switching into the MU EDCA mode, the node starts its HEMUEDCATimer countdown. The HEMUEDCATimer is reinitialized each time the node successfully (MU UL OFDMA) transmits data in a new reserved RU. The initializing value of HEMUEDCATimer is suggested to be high (e.g. tens of milliseconds) in order to encompass several new opportunities for MU UL transmissions.

When the HEMUEDCATimer lapses, the traffic queues in MU EDCA mode are switched back to the legacy EDCA mode with legacy EDCA parameters, thereby exiting the queues from the MU EDCA mode.

Thus, this mechanism of double operating modes, conventional EDCA mode and MU EDCA mode, promotes the usage of the MU UL mechanism by reducing the probability of a MU UL transmitting node to gain access to the medium using the EDCA mechanism.

The HEMUEDCATimer mechanism of reinitializing the HEMUEDCATimer each time the node successfully transmits new data in accessed reserved RU means the node remains in the MU EDCA state as long as the AP provides (scheduled or random) RUs to the node.

This approach has a main drawback as explained now.

If the node transmits data from two or more traffic queues in one or more resource units provided by the AP (for instance if a dedicated traffic queue becomes empty, the node selects other data to be sent from a traffic queue with higher priority), the two or more traffic queues are turned into the MU and more restrictive EDCA mode. They are mainly prevented from accessing the medium through EDCA access scheme, as for instance their respective AIFSN are very restrictive.

It may happen that the AP regularly provides resource units to that node (being in such situation) with an indication of a preferred traffic queue from which data are to be selected.

As long as this polling with preferred traffic queue continues, the node empties the corresponding traffic queue upon accessing the provided resource units, while keeping all the two or more traffic queues in the MU EDCA mode. It means the other traffic queue or queues remain locked in the MU and more restrictive EDCA mode, and cannot be purged by accessing the medium.

The QoS in the network is thus severely deteriorated.

SUMMARY OF INVENTION

The present invention seeks to overcome the foregoing limitations. In particular, it seeks to overcome the loss of QoS handling resulting from the introduction of the MU UL OFDMA transmissions.

The inventors have noticed the locking of the other traffic queues in a MU contention mode, such as the above MU EDCA mode, results from having the HEMUEDCATimer being reinitialized each time data from the same and preferred traffic queue are (regularly) transmitted in resource units. The unicity of the HEMUEDCATimer to simultaneously manage all the traffic queues in the MU contention mode is thus substantially detrimental to QoS.

The invention thus intends to restore some QoS by breaking the unicity of the HEMUEDCATimer.

In this context, the present invention proposes a communication method in a communication network comprising a plurality of nodes, at least one node comprising a plurality of traffic queues for serving data traffic at different priorities, each traffic queue being associated with a respective queue backoff value computed from respective queue contention parameters having legacy values in a legacy contention mode and used to contend for access to a communication channel in order to transmit data stored in the traffic queue; the method comprising, at the node:

transmitting data stored in two or more traffic queues, in one or more accessed resource units provided by another node within one or more transmission opportunities granted to the other node on the communication channel; and upon transmitting data in each accessed resource unit, setting each transmitting traffic queue (i.e. transmitting in the accessed resource unit) in a MU contention mode, different from the legacy contention mode, for a predetermined duration counted down by a respective timer associated with the transmitting traffic queue, wherein the respective queue contention parameters in the MU contention mode are set to MU values different from the legacy values; and upon expiry of any timer, switching back the associated (degraded) traffic queue to the legacy contention mode in which the respective queue contention parameters are set back to the legacy values.

The present invention thus proposes to use a dedicated HEMUEDCATimer for each AC queue, in order for them to be able to exit the MU contention mode independently of the other AC queues.

Hardware or software-implemented timers can be used.

Fairness between the two contention modes is thus restored for the 802.11ax nodes.

MU values different from the legacy values for a traffic queue means that the MU and legacy values for at least one same contention parameter differ one from the other, regardless of whether the MU and legacy values of the other contention parameters are equal or differ.

Correspondingly, the invention also regards a communication device node in a communication network comprising a plurality of nodes, the communication device comprising:

a plurality of traffic queues for serving data traffic at different priorities, each traffic queue being associated with a respective queue backoff value computed from respective queue contention parameters having legacy values in a legacy contention mode and used to contend for access to a communication channel in order to transmit data stored in the traffic queue;

a plurality of timers, each one associated with one of the traffic queues; and at least one microprocessor configured for carrying out the following steps:

transmitting data stored in two or more traffic queues, in one or more accessed resource units provided by another node within one or more transmission opportunities granted to the other node on the communication channel; and upon transmitting data in each accessed resource unit, setting each transmitting traffic queue in a MU contention mode, different from the legacy contention mode, for a predetermined duration counted down by the associated timer, wherein the respective queue contention parameters in the MU contention mode are set to MU values different from the legacy values; and upon expiry of any timer, switching back the associated (degraded) traffic queue to the legacy contention mode in which the respective queue contention parameters are set back to the legacy values.

The device node has the same advantages as the method defined above.

Optional features of the invention are defined in the appended claims. Some of these features are explained here below with reference to a method, while they can be transposed into system features dedicated to any device node according to the invention.

In embodiments, the predetermined (preferably degrading) durations used to initialize the timers associated with two respective traffic queues are different one from the other. This configuration improves the management of QoS.

In other embodiments, the predetermined durations used to initialize the timers associated with respective traffic queues are computed from a common initializing value received from the other node and from an adjusting parameter specific to the respective traffic queue. The combination of the common initializing value and the adjusting parameters for the AC queues thus makes it possible to easily adjust the duration during which each AC queue should remain in the MU contention mode. Thus, this configuration also improves the management of QoS.

In variants, the predetermined durations used to initialize the timers associated with respective traffic queues are set to respective initializing values directly received from the other node. In other words, the other node, such as an AP, directly drives the durations during which the AC queues should respectively remain in the MU contention mode.

An efficient management of QoS can thus be achieved, in particular because the other node, such as an AP, may have an overall view of the network (such as statistics on collisions, number of nodes, and so on). Adjustment to give priority to such or such AC queue is thus made easier, and the network is consequently made more efficient.

In some embodiments, the timer associated with a respective traffic queue is reinitialized to the corresponding predetermined duration each time data from the associated traffic queue is transmitted in an accessed resource unit provided by the other node within any subsequent transmission opportunity granted to the other node on the communication channel.

It means the timer for an AC queue will expires only if no data from this AC queue are transmitted in any resource unit provided by the other node during the predetermined duration having initialized this timer. Otherwise, the timer is reinitialized again.

As a consequence, this traffic queue may exit the MU contention mode by restoring the respective queue contention parameters to legacy values, only if no data from the considered AC queue are OFDMA transmitted during the specified duration.

In embodiments, the method further comprises, at the node, contending for access to the communication channel using the queue contention parameters in the MU contention mode. It means the MU contention mode follows the same contention scheme as the legacy contention mode, e.g. conventional EDCA, but with MU, preferably degraded (i.e. more restrictive), contention parameters in order to penalize the AC queues that are polled by the AP to transmit in RUs.

In embodiments, the method further comprises, at the node, periodically receiving a beacon frame from an access point, each beacon frame broadcasting network information about the communication network to the plurality of nodes, wherein at least one received beacon frame includes the legacy values and the MU values for the queue contention parameters of the plurality of traffic queues and at least one initializing value to initialize the timers to the predetermined durations associated with the traffic queues.

In embodiments, the transmitting traffic queue or queues are set in the MU contention mode only upon successfully transmitting the data in the corresponding accessed resource unit. This configuration guarantees fairness. Indeed, in the philosophy of contention mode switching, the MU mode should only be implemented to compensate the existence of other transmission opportunities (here through RUs), meaning data are successfully transmitted.

In some embodiments, the MU values include a degraded Arbitration Inter-Frame Space Number, AIFSN, compared to the legacy values. This configuration is simple to implement in order to directly reduce (up to a desired level) the chances of a specific traffic queue to access the medium through EDCA.

In particular, each queue backoff value may be initially selected from a respective contention window, the queue backoff value being decreased by the node over time to access the communication channel upon reaching zero, and
  the MU values of the queue contention parameters may
    include the same lower $CW_{min}$ and/or higher $CW_{max}$ boundaries, both defining a selection range from which a size of the contention window is selected, as the legacy values.

This configuration simplifies the entering into and the exiting from the MU contention mode (MU EDCA mode) since the contention window can be kept unchanged. However, variants may contemplate having different boundaries between the legacy and MU values.

In some embodiments, the method further comprises, at the node, upon accessing a resource unit provided by the other node within a subsequent transmission opportunity granted to the other node:
  selecting data from the traffic queues in both MU and legacy contention modes, based on associated current queue backoff values,
    transmitting the selected data in the accessed resource unit within the new transmission opportunity.

A fair management of QoS is thus maintained when implementing the present invention.

According to a specific feature, selecting data including selecting data from the traffic queue associated with the lowest current queue backoff value. EDCA-like behaviour of the AC queues is thus kept.

In alternative embodiments, the method further comprises, at the node, upon accessing a resource unit provided by the other node within a subsequent transmission opportunity granted to the other node:
  selecting data from a preferred traffic queue indicated by the other node,
    transmitting the selected data in the accessed resource unit within the new transmission opportunity.

According to a specific feature, the preferred traffic queue indication is included in a trigger frame received from the other node, the trigger frame reserving the transmission opportunity granted to the other node on the communication channel and defining resource units, RUs, forming the communication channel including the accessed resource unit.

This approach makes it possible for the other node, usually the AP, to drive the QoS management.

In some embodiments of the invention, the accessed resource unit over which the data are transmitted is a random resource unit, the access of which being made through contention using separate RU contention parameters (separate from the above-mentioned queue contention parameters).

In other embodiments, the accessed resource unit over which the data are transmitted is a scheduled resource unit, the scheduled resource being assigned by the other node to the node.

Of course, some nodes may access scheduled RUs while other nodes may simultaneously access random RUs, resulting in having simultaneously various nodes in the MU contention mode (for one or more AC queues).

In some embodiments, the other node is an access point of the communication network to which nodes register. This provision advantageously takes advantage of the central position of the access point.

From the Access Point perspective, the present invention proposes a communication method in a communication network comprising a plurality of nodes and an access point, each node comprising a plurality of traffic queues for serving data traffic at different priorities, each traffic queue being associated with a respective queue backoff value computed from respective queue contention parameters having legacy values in a legacy contention mode and used to contend for access to a communication channel in order to transmit data stored in the traffic queue;

the method comprising, at the access point:

accessing the communication channel to send a trigger frame reserving a transmission opportunity on the communication channel and defining resource units, RUs, forming the communication channel for the nodes to transmit data to the access point sending, to the nodes, a set of legacy values of the queue contention parameters and a set of MU values of the queue contention parameters, different from the set of legacy values, and a set of initializing values of node timers associated with the traffic queues respectively, to configure each node when each of two or more traffic queues of the node switches between a MU contention mode in which the respective queue contention parameters are set to MU values and a legacy contention mode, to be maintained during a predetermined duration initialized based on the associated initializing value and counted down by an associated timer, wherein the respective queue contention parameters in the MU contention mode are set to respective MU values.

Correspondingly, an access point in a communication network also comprising a plurality of nodes, each node comprising a plurality of traffic queues for serving data traffic at different priorities, each traffic queue being associated with a respective queue backoff value computed from respective queue contention parameters having legacy values in a legacy contention mode and used to contend for access to a communication channel in order to transmit data stored in the traffic queue;

the access point comprising at least one microprocessor configured for carrying out the following steps:

accessing the communication channel to send a trigger frame reserving a transmission opportunity on the communication channel and defining resource units, RUs, forming the communication channel for the nodes to transmit data to the access point sending, to the nodes, a set of legacy values of the queue contention parameters and a set of MU values of the queue contention parameters, different from the set of legacy values, and a set of initializing values of node timers associated with the traffic queues respectively, to configure each node when each of two or more traffic queues of the node switches between a legacy contention mode in which the respective queue contention parameters are set to legacy values and a MU contention mode, to be maintained during a predetermined duration initialized based on the associated initializing value and counted down by an associated timer, wherein the respective queue contention parameters in the MU contention mode are set to respective MU values.

The access point may thus efficiently control fairness in the network. Indeed, through the MU values and the values of the timers, the access point may drive the nodes to adjust their EDCA access scheme under MU contention mode, different from the conventional legacy mode.

Preferably, the legacy and MU values, as well as the timer values, can be evaluated based on history of past transmissions from the nodes, in particular in RUs provided by the access point (random or scheduled RUs).

Optional features of the invention are defined in the appended claims. Some of these features are explained here below with reference to a method, while they can be transposed into system features dedicated to any device node according to the invention.

In some embodiments, the sets of legacy values and of MU values and of initializing values are transmitted within one or more beacon frames, periodically transmitted by the access point to broadcast network information about the communication network to the plurality of nodes.

In yet other embodiments, the sets of legacy values and of MU values differ by different Arbitration Inter-Frame Space Numbers, AIFSNs.

In particular, each queue backoff value of a node may be initially selected from a respective contention window, the queue backoff value being decreased by the node over time to access the communication channel upon reaching zero, and the sets of legacy values and of MU values may include the same lower boundaries $CW_{min}$ and/or higher boundaries $CW_{max}$, both defining together selection ranges from which sizes of the contention windows associated with the traffic queues are respectively selected.

Another aspect of the invention relates to a non-transitory computer-readable medium storing a program which, when executed by a microprocessor or computer system in a device, causes the device to perform any method as defined above.

The non-transitory computer-readable medium may have features and advantages that are analogous to those set out above and below in relation to the methods and devices.

Another aspect of the invention relates to a method, substantially as herein described with reference to, and as shown in, FIG. 5b, or FIG. 11, or FIGS. 11 and 12, or FIGS. 11, 12 and 14b, or FIGS. 11, 12 and 14c of the accompanying drawings.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Further advantages of the present invention will become apparent to those skilled in the art upon examination of the drawings and detailed description. Embodiments of the invention will now be described, by way of example only, and with reference to the following drawings.

FIG. 5a illustrates the states of transmitting traffic queues switched in MU EDCA mode as known in the prior art;

FIG. 5b illustrates the states of transmitting traffic queues switched in MU EDCA mode according to embodiments of the invention;

DETAILED DESCRIPTION

The invention will now be described by means of specific non-limiting exemplary embodiments and by reference to the figures.

Figure 1:
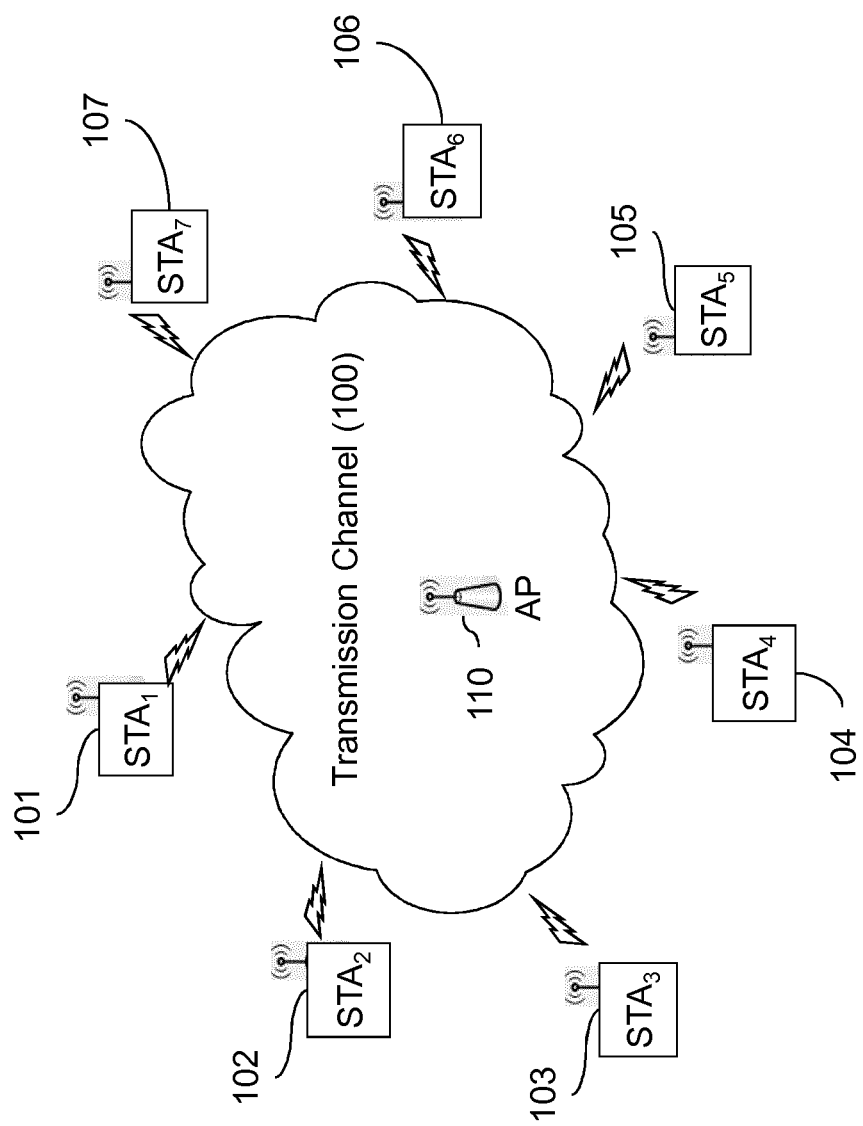
FIG. 1 illustrates a typical wireless communication system in which embodiments of the invention may be implemented.

FIG. 1 illustrates a communication system in which several communication nodes (or stations) 101-107 exchange data frames over a radio transmission channel 100 of a wireless local area network (WLAN), under the management of a central station, or access point (AP) 110 with which the nodes have registered. The radio transmission channel 100 is defined by an operating frequency band constituted by a single channel or a plurality of channels forming a composite channel.

Access to the shared radio medium to send data frames is based on the CSMA/CA technique, for sensing the carrier and avoiding collision by separating concurrent transmissions in space and time.

Carrier sensing in CSMA/CA is performed by both physical and virtual mechanisms. Virtual carrier sensing is achieved by transmitting control frames to reserve the medium prior to transmission of data frames.

Next, a source or transmitting node, including the AP, first attempts, through the physical mechanism, to sense a medium that has been idle for at least one DIFS (standing for DCF InterFrame Spacing) time period, before transmitting data frames.

However, if it is sensed that the shared radio medium is busy during the DIFS period, the source node continues to wait until the radio medium becomes idle.

To access the medium, the node starts a countdown backoff counter designed to expire after a number of timeslots, chosen randomly in a so-called contention window [0, CW], CW (integer). This backoff mechanism or procedure, also referred to as channel access scheme, is the basis of the collision avoidance mechanism that defers the transmission time for a random interval, thus reducing the probability of collisions on the shared channel. After the backoff time period (i.e. the backoff counter reaches zero), the source node may send data or control frames if the medium is idle.

One problem of wireless data communications is that it is not possible for the source node to listen while sending, thus preventing the source node from detecting data corruption due to channel fading or interference or collision phenomena. A source node remains unaware of the corruption of the data frames sent and continues to transmit the frames unnecessarily, thus wasting access time.

The Collision Avoidance mechanism of CSMA/CA thus provides positive acknowledgement (ACK) of the sent data frames by the receiving node if the frames are received with success, to notify the source node that no corruption of the sent data frames occurred.

The ACK is transmitted at the end of reception of the data frame, immediately after a period of time called Short InterFrame Space (SIFS).

If the source node does not receive the ACK within a specified ACK timeout or detects the transmission of a different frame on the channel, it may infer data frame loss.

In that case, it generally reschedules the frame transmission according to the above-mentioned backoff procedure.

To improve the Collision Avoidance efficiency of CSMA/CA, a four-way handshaking mechanism is optionally implemented. One implementation is known as the RTS/CTS exchange, defined in the 802.11 standard.

The RTS/CTS exchange consists in exchanging control frames to reserve the radio medium prior to transmitting data frames during a transmission opportunity called TXOP in the 802.11 standard, thus protecting data transmissions from any further collisions. The four-way CTS/RTS handshaking mechanism is well known, and thus not further described here. Reference is made to the standard for further details The RTS/CTS four-way handshaking mechanism is very efficient in terms of system performance, in particular with regard to large frames since it reduces the length of the messages involved in the contention process.

In detail, assuming perfect channel sensing by each communication node, collision may only occur when two (or more) frames are transmitted within the same time slot after a DIFS (DCF inter-frame space) or when the backoff counters of the two (or more) source nodes have reached zero nearly at the same time. If both source nodes use the RTS/CTS mechanism, this collision can only occur for the RTS frames. Fortunately, such collision is early detected by the source nodes upon not receiving a CTS response.

Management of quality of service (QoS) has been introduced at node level in such wireless networks, through well-known EDCA mechanism defined in the IEEE 802.11e standard.

Indeed, in the original DCF standard, a communication node includes only one transmission queue/buffer. However, since a subsequent data frame cannot be transmitted until the transmission/retransmission of a preceding frame ends, the delay in transmitting/retransmitting the preceding frame prevented the communication from having QoS.

Figures 2A, 2B, 2C:
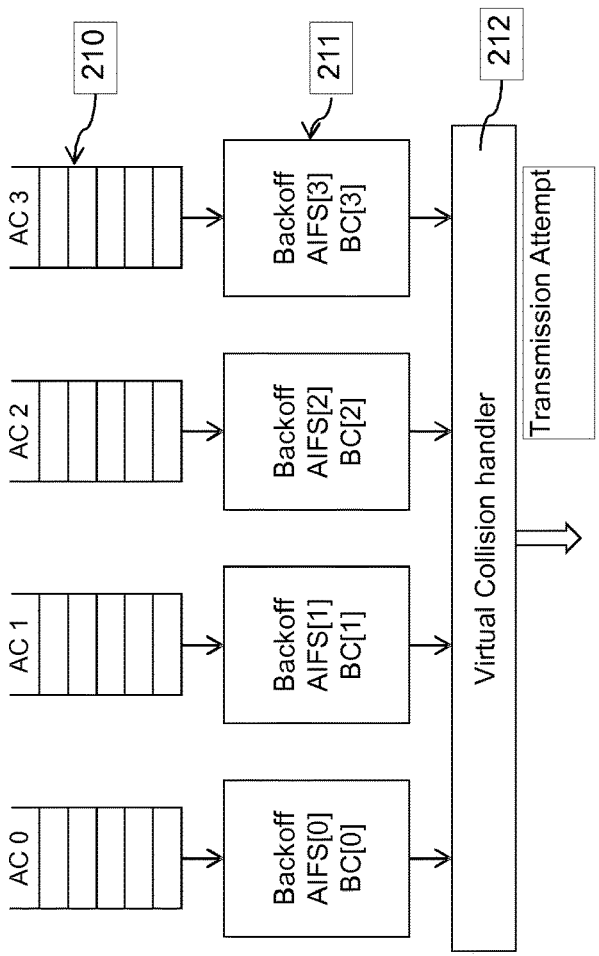
FIGS. 2a, 2b illustrate the IEEE 802.11e EDCA involving access categories.
FIG. 2c illustrates an example of values for the degraded EDCA parameter set.

FIGS. 2a, and 2b illustrate the IEEE 802.11e EDCA mechanism involving access categories, in order to improve the quality of service (QoS).

The 802.11e standard relies on a coordination function, called hybrid coordination function (HCF), which has two modes of operation: enhanced distributed channel access (EDCA) and HCF controlled channel access (HCCA).

EDCA enhances or extends functionality of the original access DCF method: EDCA has been designed to support prioritized traffics similar to DiffServ (Differentiated Services), which is a protocol for specifying and controlling network traffic by class so that certain types of traffic get precedence.

EDCA is the dominant channel access scheme or mechanism in WLANs because it features a distributed and easily deployed mechanism. The scheme contends for access to at least one communication channel of the communication network using contention parameters, in order for the node to transmit data stored locally over an accessed communication channel.

The above deficiency of failing to have satisfactory QoS due to delay in frame retransmission has been solved with a plurality of transmission queues/buffers.

QoS support in EDCA is achieved with the introduction of four Access Categories (ACs), and thereby of four corresponding transmission/traffic queues or buffers (210). Usually, the four ACs are the following in decreasing priority order: voice (or "AC_VO"), video (or "AC_VI"), best effort (or "AC_BE") and background (or "AC_BG").

Of course, another number of traffic queues may be contemplated.

Each AC has its own traffic queue/buffer to store corresponding data frames to be transmitted on the network. The data frames, namely the MSDUs, incoming from an upper layer of the protocol stack are mapped onto one of the four AC queues/buffers and thus input in the mapped AC buffer.

Each AC has also its own set of queue contention parameters, and is associated with a priority value, thus defining traffics of higher or lower priority of MSDUs. Thus, there is a plurality of traffic queues for serving data traffic at different priorities. The queue contention parameters usually include $CW_{min}$, $CW_{max}$, AIFSN and TXOP_Limit parameters for each traffic queue. $CW_{min}$ and $CW_{max}$ are the lower and higher boundaries of a selection range from which the EDCA contention window CW is selected for a given traffic queue. AIFSN stands for Arbitration Inter-Frame Space Number, and defines a number of time slots (usually 9 μs), additional to a DIFS interval (the total defining the AIFS period), the node must sense the medium as idle before decrementing the queue backoff value/counter associated with the traffic queue considered. TXOP_Limit defines the maximum size of a TXOP the node may request.

That means that each AC (and corresponding buffer) acts as an independent DCF contending entity including its respective queue backoff engine 211. Thus, each queue backoff engine 211 is associated with a respective traffic queue 210 for using queue contention parameters and setting a respective queue backoff value/counter (randomly selected from the CW), to be used to contend for access to at least one communication channel in order to transmit data stored in the respective traffic queue over an accessed communication channel.

The contention window CW and the queue backoff value/counter are known as EDCA variables.

It results that the ACs within the same communication node compete one with each other to access the wireless medium and to obtain a transmission opportunity, using the conventional EDCA access scheme as explained above for example.

Service differentiation between the ACs is achieved by setting different queue backoff parameters between the ACs, such as different $CW_{min}$, $CW_{max}$, AIFSN and/or different transmission opportunity duration limits (TXOP_Limit). This contributes to adjusting QoS.

The usage of the AIFSN parameter and queue backoff values to access the medium in the EDCA mechanism is described below with reference to FIG. 3a.

FIG. 2b illustrates default values for the $CW_{min}$, $CW_{max}$ and AIFSN parameters.

In this table, typical respective values for aCWmin and aCWmax are defined in the above-mentioned standard as being respectively 15 and 1023. Other values may be set by a node in the network (typically an Access Point) and shared between the nodes. This information may be broadcast in a beacon frame.

To determine the delay, AIFS[i], between the detection of the medium being free and the beginning of the queue backoff value decrementing for traffic queue T, the node multiplies the value indicated in the AIFSN parameter for traffic queue T, i.e. AIFSN[i], by a time slot duration (typically 9 micro second), and adds this value to a DIFS duration.

Figures 3A, 3B:
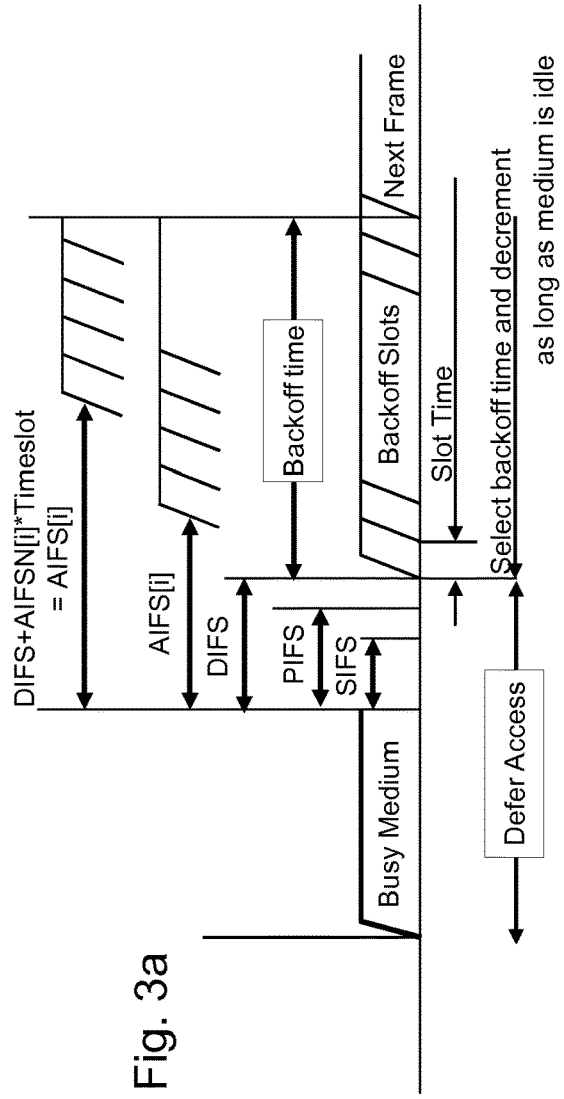
FIG. 3a illustrates 802.11ac mechanism for the backoff counter countdown.
FIG. 3b illustrates an example of mapping between eight priorities of traffic class and the four EDCA ACs.

As shown in FIG. 3a, it results that each traffic queue waits an AIFS[i] period (that includes the DIFS period deferring access to the medium) before decrementing its associated queue backoff value/counter. The Figure shows two AIFS[i] corresponding to two different ACs. One can see that one prioritized traffic queue starts decrementing its backoff value earlier than the other less prioritized traffic queue. This situation is repeated after each new medium access by any node in the network.

This decrementing deferring mechanism, additional to the use of an on-average lower CW, makes that high priority traffic in EDCA has a higher chance to be transmitted than low priority traffic: a node with high priority traffic statistically waits a little less before it sends its packet, on average, than a node with low priority traffic.

The EDCA queue backoff values or counters thus play two roles. First, they drive the nodes in efficiently accessing the medium, by reducing risks of collisions. Second, they offer management of quality of service, QoS, by mirroring the aging of the data contained in the traffic queue (the more aged the data, the lower the backoff value) and thus providing different priorities to the traffic queues through different values of the EDCA parameters (especially the AIFSN parameter that delays the start of the decrementing of the EDCA queue backoff values).

Referring to FIG. 2a, buffers AC3 and AC2 are usually reserved for real-time applications (e.g., voice AC_VO or video AC_VI transmission). They have, respectively, the highest priority and the last-but-one highest priority.

Buffers AC1 and AC0 are reserved for best effort (AC_BE) and background (AC_BG) traffic. They have, respectively, the last-but-one lowest priority and the lowest priority.

Each data unit, MSDU, arriving at the MAC layer from an upper layer (e.g. Link layer) with a priority is mapped into an AC according to mapping rules. FIG. 3b shows an example of mapping between eight priorities of traffic class (User Priorities or UP, 0-7 according to IEEE 802.1d) and the four ACs. The data frame is then stored in the buffer corresponding to the mapped AC.

When the backoff procedure for a traffic queue (or an AC) ends, the MAC controller (reference 704 in FIG. 7 below) of the transmitting node transmits a data frame from this traffic queue to the physical layer for transmission onto the wireless communication network.

Since the ACs operate concurrently in accessing the wireless medium, it may happen that two ACs of the same communication node have their backoff ending simultaneously. In such a situation, a virtual collision handler (212) of the MAC controller operates a selection of the AC having the highest priority (as shown in FIG. 3b) between the conflicting ACs, and gives up transmission of data frames from the ACs having lower priorities.

Then, the virtual collision handler commands those ACs having lower priorities to start again a backoff operation using an increased CW value.

The QoS resulting from the use of the ACs may be signalled in the MAC data frames, for instance in a QoS control field included in the header of the IEEE 802.11e MAC frame.

Figure 4A:
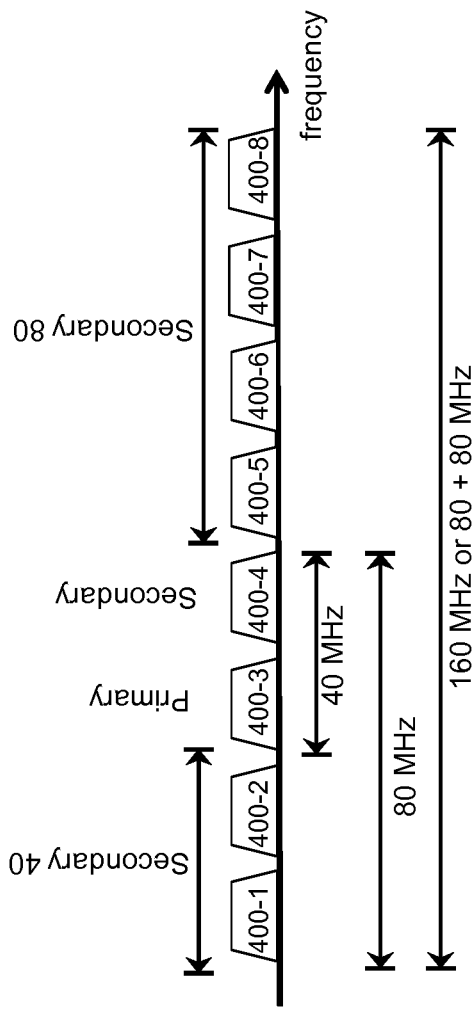
FIG. 4a illustrates 802.11ac channel allocation that support channel bandwidth of 20 MHz, 40 MHz, 80 MHz or 160 MHz as known in the art.

To meet the ever-increasing demand for faster wireless networks to support bandwidth-intensive applications, 802.11ac is targeting larger bandwidth transmission through multi-channel operations. FIG. 4a illustrates 802.11ac channel allocation that support composite channel bandwidth of 20 MHz, 40 MHz, 80 MHz or 160 MHz IEEE 802.11ac introduces support of a restricted number of predefined subsets of 20 MHz channels to form the sole predefined composite channel configurations that are available for reservation by any 802.11ac node on the wireless network to transmit data.

The predefined subsets are shown in the Figure and correspond to 20 MHz, 40 MHz, 80 MHz, and 160 MHz channel bandwidths, compared to only 20 MHz and 40 MHz supported by 802.11 n. Indeed, the 20 MHz component channels 300-1 to 300-8 are concatenated to form wider communication composite channels.

In the 802.11ac standard, the channels of each predefined 40 MHz, 80 MHz or 160 MHz subset are contiguous within the operating frequency band, i.e. no hole (missing channel) in the composite channel as ordered in the operating frequency band is allowed.

The 160 MHz channel bandwidth is composed of two 80 MHz channels that may or may not be frequency contiguous. The 80 MHz and 40 MHz channels are respectively composed of two frequency-adjacent or contiguous 40 MHz and 20 MHz channels, respectively. However the present invention may have embodiments with either composition of the channel bandwidth, i.e. including only contiguous channels or formed of non-contiguous channels within the operating band.

A node is granted a TXOP through the enhanced distributed channel access (EDCA) mechanism on the "primary channel" (400-3). Indeed, for each composite channel having a bandwidth, 802.11ac designates one channel as "primary" meaning that it is used for contending for access to the composite channel. The primary 20 MHz channel is common to all nodes (STAs) belonging to the same basic set, i.e. managed by or registered with the same local Access Point (AP).

However, to make sure that no other legacy node (i.e. not belonging to the same set) uses the secondary channels, it is provided that the control frames (e.g. RTS frame/CTS frame) reserving the composite channel are duplicated over each 20 MHz channel of such composite channel.

As addressed earlier, the IEEE 802.11ac standard enables up to four, or even eight, 20 MHz channels to be bound. Because of the limited number of channels (19 in the 5 GHz band in Europe), channel saturation becomes problematic. Indeed, in densely populated areas, the 5 GHz band will surely tend to saturate even with a 20 or 40 MHz bandwidth usage per Wireless-LAN cell.

Developments in the 802.11ax standard seek to enhance efficiency and usage of the wireless channel for dense environments.

In this perspective, one may consider multi-user (MU) transmission features, allowing multiple simultaneous transmissions to/from different users in both downlink (DL) and uplink (UL) directions with a main node, usually an AP. In the uplink, multi-user transmissions can be used to mitigate the collision probability by allowing multiple nodes to simultaneously transmit to the AP.

To actually perform such multi-user transmission, it has been proposed to split a granted 20 MHz channel (400-1 to 400-4) into sub-channels 410 (elementary sub-channels), also referred to as sub-carriers or resource units (RUs), that are shared in the frequency domain by multiple users, based for instance on Orthogonal Frequency Division Multiple Access (OFDMA) technique.

This is illustrated with reference to FIG. 4.

The multi-user feature of OFDMA allows, a node, usually an access point, AP, to assign different RUs to different nodes in order to increase competition. This may help to reduce contention and collisions inside 802.11 networks.

Contrary to MU downlink OFDMA wherein the AP can directly send multiple data to multiple nodes (supported by specific indications inside the PLCP header), a trigger mechanism has been adopted for the AP to trigger MU uplink communications from various nodes.

To support a MU uplink transmission (during a TxOP pre-empted by the AP), the 802.11ax AP has to provide signalling information for both legacy nodes (non-802.11ax nodes) to set their NAV and for 802.11ax nodes to determine the Resource Units allocation.

In the following description, the term legacy refers to non-802.11ax nodes, meaning 802.11 nodes of previous technologies that do not support OFDMA communications.

Figure 4:
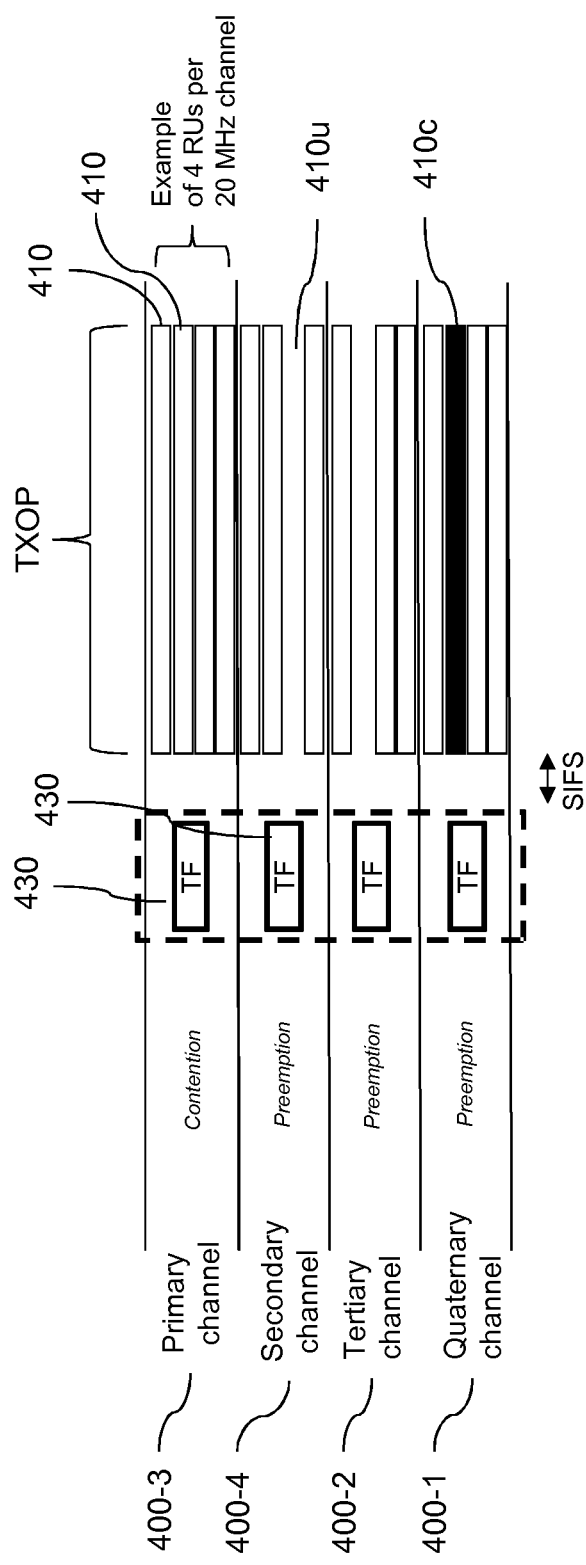
FIG. 4 illustrates an example of 802.11ax uplink OFDMA transmission scheme, wherein the AP issues a Trigger Frame for reserving a transmission opportunity of OFDMA sub-channels (resource units) on an 80 MHz channel as known in the art.

As shown in the example of FIG. 4, the AP sends a trigger frame (TF) 430 to the targeted 802.11ax nodes. The bandwidth or width of the targeted composite channel is signalled in the TF frame, meaning that the 20, 40, 80 or 160 MHz value is signalled. The TF frame is sent over the primary 20 MHz channel and duplicated (replicated) on each other 20 MHz channels forming the targeted composite channel. As described above for the duplication of control frames, it is expected that every nearby legacy node (non-HT or 802.11ac nodes) receiving the TF frame (or a duplicate thereof) on its primary channel, then sets its NAV to the value specified in the TF frame. This prevents these legacy nodes from accessing the channels of the targeted composite channel during the TXOP.

Based on an AP's decision, the trigger frame TF may define a plurality of resource units (RUs) 410, or "Random RUs", which can be randomly accessed by the nodes of the network. In other words, Random RUs designated or allocated by the AP in the TF may serve as basis for contention between nodes willing to access the communication medium for sending data. A collision occurs when two or more nodes attempt to transmit at the same time over the same RU.

In that case, the trigger frame is referred to as a trigger frame for random access (TF-R). A TF-R may be emitted by the AP to allow multiple nodes to perform MU UL (Multi-User UpLink) random access to obtain an RU for their UL transmissions.

The trigger frame TF may also designate Scheduled resource units, in addition to or in replacement of the Random RUs. Scheduled RUs may be reserved by the AP for certain nodes in which case no contention for accessing such RUs is needed for these nodes. Such RUs and their corresponding scheduled nodes are indicated in the trigger frame. For instance, a node identifier, such as the Association ID (AID) assigned to each node upon registration, is added, in the TF frame, in association with each Scheduled RU in order to explicitly indicate the node that is allowed to use each Scheduled RU.

An AID equal to 0 may be used to identify random RUs.

The multi-user feature of OFDMA allows the AP to assign different RUs to different nodes in order to increase competition. This may help to reduce contention and collisions inside 802.11 networks.

In the example of FIG. 4, each 20 MHz channel (400-1, 400-2, 400-3 or 400-4) is sub-divided in the frequency domain into four sub-channels or RUs 410, typically of size 5 Mhz.

Of course the number of RUs splitting a 20 MHz channel may be different from four. For instance, between two to nine RUs may be provided (thus each having a size between 10 MHz and about 2 MHz).

Once the nodes have used the RUs to transmit data to the AP, the AP responds with an acknowledgment ACK (not show in the Figure) to acknowledge the data on each RU, making it possible for each node to know when its data transmission is successful (reception of the ACK) or not (no ACK after expiry of a time-out).

Document IEEE 802.11-15/1105 provides an exemplary random allocation procedure that may be used by the nodes to access the Random RUs indicated in the TF. This random allocation procedure, referred to as RU contention scheme, is managed by a dedicated RU access module separate from the above-mentioned channel access module and is configured to manage access to at least one resource unit provided by another node (usually the AP) within a transmission opportunity granted to the other node on the communication channel, in order to transmit data stored locally over an accessed resource unit. Preferably, the RU access module includes an RU backoff engine separate from the queue backoff engines, which uses RU contention parameters, including a computed RU backoff value, to contend for access to the random RUs.

In other words, the RU contention scheme is based on a new backoff counter, referred to as the OFDMA or RU backoff counter/value (or OBO), inside the 802.11ax nodes for allowing a dedicated contention when accessing a random RU to send data.

Each node STA1 to STAn is a transmitting node with regards to receiving AP, and as a consequence, each node has an active RU backoff engine separate from the queue backoff engines, for computing an RU backoff value (OBO) to be used to contend for access to at least one random resource unit splitting a transmission opportunity granted on the communication channel, in order to transmit data stored in either traffic queue AC.

The random allocation procedure in this document comprises, for a node of a plurality of nodes having an active RU backoff value OBO, a first step of determining from the trigger frame the random sub-channels or RUs of the communication medium available for contention, a second step of verifying if the value of the active RU backoff value OBO local to the considered node is not greater than a number of detected-as-available random RUs, and then, in case of successful verification, a third step of randomly selecting a random RU among the detected-as-available random RUs for sending data. In case the second step is not verified, a fourth step (instead of the third) is performed in order to decrement the RU backoff value OBO by the number of detected-as-available RUs.

As shown in the Figure, some Resource Units may not be used (410u) because no node with an RU backoff value OBO less than the number of available random RUs has randomly selected one of these random RUs, whereas some other have collided (as example 410c) because two of these nodes have randomly selected the same RU.

The MU Uplink (UL) medium access scheme, including both scheduled RUs and random RUs, proves to be very efficient compared to conventional EDCA access scheme. This is because the number of collisions generated by simultaneous medium access attempts and the overhead due to the medium access are both reduced.

However, the EDCA access scheme and MU UL OFDMA/RU access scheme have to coexist, in particular to allow legacy 802.11 nodes to access the medium and to allow even the 802.11ax nodes to initiate communication with nodes other than the AP.

Although the EDCA access scheme taken alone provides a fair access to the medium throughout all the nodes, its association with the MU UL OFDMA/RU access scheme introduces a drift in fairness. This is because, compared to the legacy nodes, the 802.11ax nodes have additional opportunities to send data through the resource units offered in the transmission opportunities granted to another node, in particular to the AP.

To restore some fairness between the nodes, solutions have been proposed,

For instance in co-pending UK application No 1612151.9 filed on 13 Jul. 2016, a current value of at least one EDCA parameter is modified into different values (MU EDCA parameters), upon successfully transmitting data over an accessed resource unit (i.e. through UL OFDMA transmission). This is to reduce a probability for the node to access a communication channel through (conventional EDCA) contention.

In this framework, a mechanism has been proposed to reduce the node's probability of EDCA-based transmission (i.e. using the EDCA medium access scheme) as soon as the node successfully uses the MU UL mechanism to transmit its data. This reduction is made by modifying the well-known EDCA parameters.

The proposed mechanism, as described in document IEEE 802.11-16/1180 entitled "Proposed text changes for MU EDCA parameters", sets each transmitting traffic queue in a MU EDCA mode in response to successfully transmitting the data in the accessed MU UL OFDMA resource unit. The setting is done for a predetermined duration, known as HEMUEDCATimer. The MU EDCA mode is a mode in which the respective EDCA parameters are set to MU values different from legacy values used in a different legacy EDCA mode.

To switch from legacy EDCA contention access mode to the MU EDCA mode, the node may modify its EDCA parameters (AIFSN, $CW_{min}$, and/or $CW_{max}$) for all the traffic queues having successfully transmitted some data in the accessed resource unit. The switch back to the legacy EDCA mode may occur upon expiry of the HEMUEDCATimer, being noted that this timer is reset to its initial value each time the node transmits again new data (from either AC) during newly accessed resource units provided by the AP. The initializing value of HEMUEDCATimer is suggested to be high (e.g. tens of milliseconds) in order to encompass several new opportunities for MU UL transmissions.

The MU values for the EDCA parameters may be transmitted by the AP in a Dedicated Information Element, typically sent within a beacon frame broadcasting network information to the nodes.

The disclosed approach suggests increasing only the value of AIFSN for each transmitting traffic queue, while keeping $CW_{min}$ and $CW_{max}$ unchanged. As the corresponding AIFS period increases, each traffic queue in the MU EDCA mode is prevented (or at least substantially delayed) from having its queue backoff value or counter been decremented upon sensing the medium free again. New accesses to the medium using EDCA access scheme are statistically substantially reduced, or even no longer possible, during the above-mentioned predetermined duration.

The MU-mode AIFSN value may be very restrictive. So, in high density environment where the medium is busy most of the time (and thus remain free for very short time), the node in MU EDCA mode must wait for the corresponding very restrictive AIFS period, and thus does not decrement the backoff value of the AC queue in MU EDCA mode very often. The result is that the node cannot EDCA-contend for access to the medium very often.

Note that a specific configuration in the publication tends to totally prevent (except if the network is not used at all) the transmitting traffic queues from EDCA-accessing the medium while in the MU EDCA mode. The AP specifies this particular operating mode by indicating a specific value of the AIFSN parameter (typically 0) in the set of MU EDCA parameters. Such specific value means for the node that it shall use a very high value for its AIFSN, which value is equal to the HEMUEDCATimer as transmitted by the AP (it is reminded its value should be high, about tens of milliseconds, to be compared to less than 0.1 millisecond for the worst AIFS[i] in the legacy EDCA mode).

Unfortunately, as long as the node regularly accesses OFDMA RUs to transmit data, its traffic queues in the MU EDCA mode remain in the same MU mode. This applies in particular for those traffic queues in the MU mode that do not even send any data in the accessed OFDMA RUs over a potential lengthy period of regular OFDMA accesses. This is contrary to the QoS principle as described in the 802.11e standard.

This situation is now illustrated with reference to FIG. 5a which describes an example of application using MU EDCA parameters as described in the above-mentioned publication.

In the scenario of this Figure, the AP 501 polls a node 502 by sending a standardized Trigger Frame 1300 requesting the node to transmit some QoS data coming from the AC_VI access category. This may be done by providing one or more Scheduled RUs to that node. The category may be indicated in the "Preferred AC" field 1330 shown in FIG. 13.

After a SIFS time, node 502 initiates a MU UL OFDMA transmission 510 by picking up some QoS data (511) from solicited traffic queue AC_VI. In this exemplary scenario, there is not enough QoS data ready to be sent in the solicited traffic queue AC_VI. In this context, node 502 is allowed to retrieve other QoS data (512) from a higher-priority traffic queue, for instance the AC_VO access category in the example. This data retrieval rule makes it possible to maximize bandwidth usage as specified in the 802.11 standard.

Thus, node 502 transmits AC_VI data 511 and AC_VO data 512 to the AP using the scheduled RU. The corresponding two transmitting traffic queues, AC_VI and AC_VO, thus switch to the MU EDCA mode (symbolized by white figures in black boxes), in which node 502 now uses MU EDCA parameters for each of these transmitting traffic queues. Particularly, higher values for the AIFSN parameter may be used, and optionally for the $CW_{min}$ and $CW_{min}$ parameters.

In parallel, the HEMUEDCATimer 590 is launched to count down when node 502 will be allowed to switch back to the legacy EDCA mode with legacy EDCA parameters. The switch back may occur after a predetermined duration expires, i.e. when the HEMUEDCATimer reaches 0.

However, the HEMUEDCATimer is reinitialized to its initial value (the predetermined duration) each time node 502 transmits data in an accessed resource unit provided by the AP within any subsequent transmission opportunity granted to the AP on the communication channel. In other words, the timer is reinitialized each time node 502 is polled again by the AP.

This occurs in the example of FIG. 5a when AP 501 sends a new trigger frame 1300-2 with a new RU for node 502, while the HEMUEDCATimer 590 has not yet expired. The AP again polls node 502 to send QoS data from AC_VI access category.

Node 502 again transmits QoS data 520 from the AC_VI access category and the HEMUEDCATimer 590 is reinitialized to its initial value, the predetermined duration. The same occurs when AP 501 polls again node 502 to send new QoS data from AC_VI access category, by sending a new trigger frame 1300-3.

In this scenario, node 502 is regularly polled by the AP for OFDMA transmission of QoS data from AC_VI. Finally, as long as enough data are provided by the AC_VI category, the AC_VO category is never involved in a new OFDMA transmission and remains blocked in the MU EDCA mode.

In addition, due to its MU-mode AIFSN value (usually more restrictive value, i.e. high value), the traffic queue AC_VO is prevented (or severely delayed) from decrementing the associated backoff value for EDCA-contending the medium.

It results that the AC_VO category, which by essence has the highest QoS priority, remains locked in the MU EDCA mode without having new EDCA opportunities to send its data. The QoS requirements of 802.11ax thus remain severely deteriorated.

It is within this framework that the present invention proposes to restore QoS fairness by breaking the unicity of the HEMUEDCATimer by which the traffic queues in MU mode are locked in case of regular node polling by the AP.

In particular, upon (preferably successfully) transmitting data stored in two or more traffic queues, in each of one or more accessed resource units provided by another node within one or more transmission opportunities granted to the other node on the communication channel, node 502 may set each transmitting traffic queue (i.e. transmitting in the accessed resource unit) in a MU EDCA mode, different from the legacy EDCA mode, for a predetermined duration counted down by a respective timer associated with the transmitting traffic queue. Next, upon expiry of any timer, node 502 may switch back the associated traffic queue to the legacy EDCA mode in which the respective EDCA parameters are set back to the legacy values.

The present invention thus provides the node with a plurality of timers, each one being associated with one of the traffic queues. As a specific HEMUEDCATimer is dedicated for each AC queue, the latter can exit the MU EDCA mode independently of the other AC queues. QoS at AC queue level is thus restored.

The result of one implementation of the present invention is now illustrated with reference to FIG. 5b which describes, with the same sequence as in FIG. 5a, the restoring of QoS through the handling of independent HEMUEDCATimers.

After the first TF 1300, both transmitting traffic queues, AC_VI and AC_VO, are in the MU EDCA mode. Their respective HEMUEDCATimer, 591 for AC_VI and 592 for AC_VO, are started simultaneously to count down when each respective traffic queue is allowed to switch back to the legacy EDCA mode with legacy EDCA parameters.

According to the invention, the evolving of these separate timers is independent one of the other.

As explained below, different predetermined durations may be used to initialize the two timers associated with AC_VI and AC_VO. This is to improve the QoS management.

Thus, when the next TF 1300-2 is received and AC_VI data are transmitted in the accessed OFDMA RU as required by the AP, HEMUEDCATimer 591 associated with AC_VI is reinitialized with its corresponding initial predetermined duration, while HEMUEDCATimer 592 associated with AC_VO continues elapsing (because no VO data have been transmitted in the accessed RU following TF 1300-2).

As a consequence, HEMUEDCATimer 592 associated with AC_VO expires before HEMUEDCATimer 591 associated with AC_VI, loosening the MU EDCA constraints on traffic queue AC_VO. Practically, traffic queue AC_VO is switched back to the legacy EDCA mode in which legacy EDCA parameters are used. The backoff value of the AC_VO traffic queue can thus be decreased as normal way allowing the AC_VO queue to efficiently contend the medium.

Figures 6, 7:
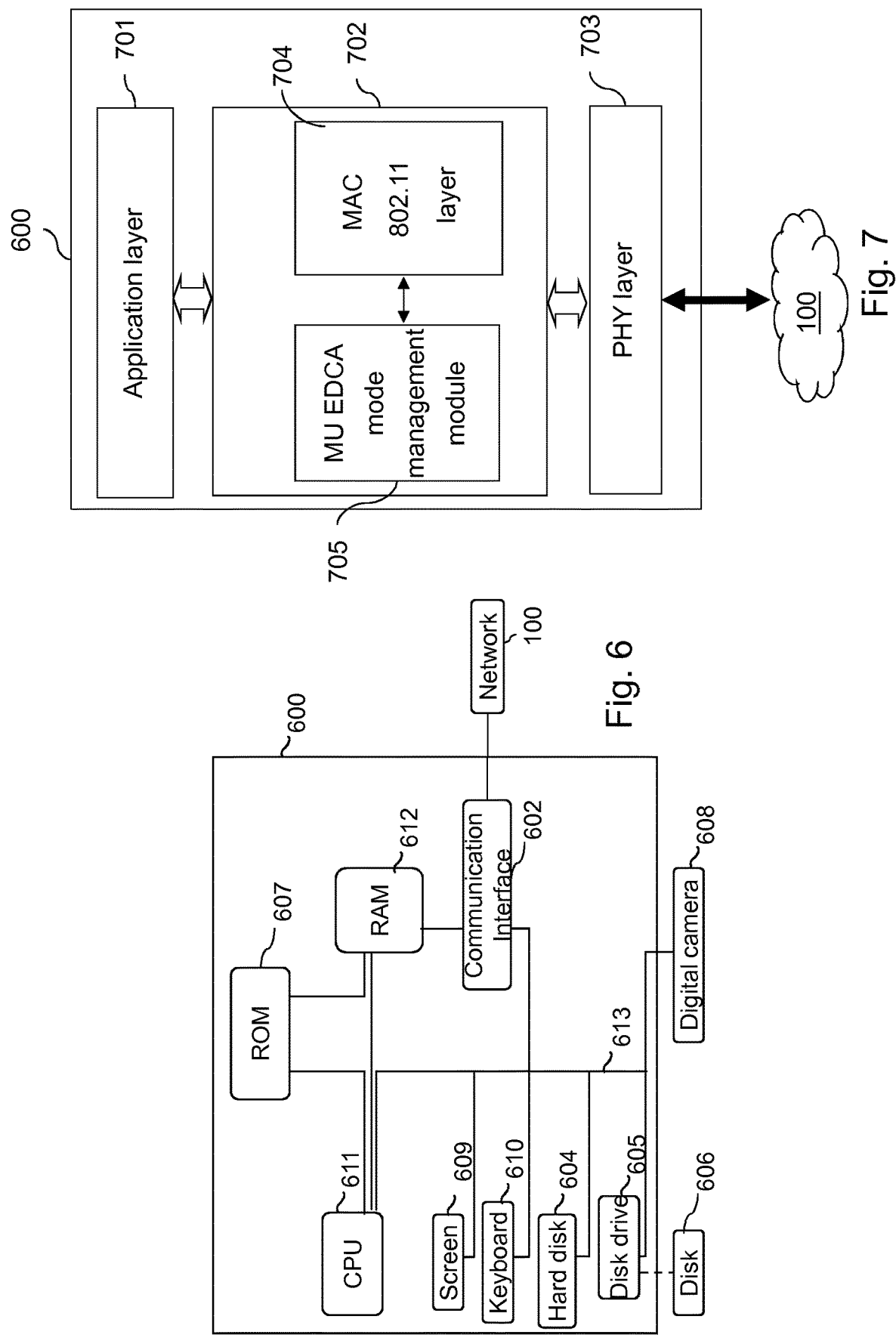
FIG. 6 shows a schematic representation a communication device or station in accordance with embodiments of the present invention.
FIG. 7 shows a schematic representation of a wireless communication device in accordance with embodiments of the present invention.

FIG. 6 schematically illustrates a communication device 600 of the radio network 100, configured to implement at least one embodiment of the present invention. The communication device 600 may preferably be a device such as a micro-computer, a workstation or a light portable device. The communication device 600 comprises a communication bus 613 to which there are preferably connected:
- a central processing unit 611, such as a microprocessor, denoted CPU;
- a read only memory 607, denoted ROM, for storing computer programs for implementing the invention;
- a random access memory 612, denoted RAM, for storing the executable code of methods according to embodiments of the invention as well as the registers adapted to record variables and parameters necessary for implementing methods according to embodiments of the invention; and
- at least one communication interface 602 connected to the radio communication network 100 over which digital data packets or frames or control frames are transmitted, for example a wireless communication network according to the 802.11ax protocol. The frames are written from a FIFO sending memory in RAM 612 to the network interface for transmission or are read from the network interface for reception and writing into a FIFO receiving memory in RAM 612 under the control of a software application running in the CPU 611.

Optionally, the communication device 600 may also include the following components:
- a data storage means 604 such as a hard disk, for storing computer programs for implementing methods according to one or more embodiments of the invention;
- a disk drive 605 for a disk 606, the disk drive being adapted to read data from the disk 606 or to write data onto said disk;
- a screen 609 for displaying decoded data and/or serving as a graphical interface with the user, by means of a keyboard 610 or any other pointing means.

The communication device 600 may be optionally connected to various peripherals, such as for example a digital camera 608, each being connected to an input/output card (not shown) so as to supply data to the communication device 600.

Preferably the communication bus provides communication and interoperability between the various elements included in the communication device 600 or connected to it. The representation of the bus is not limiting and in particular the central processing unit is operable to communicate instructions to any element of the communication device 600 directly or by means of another element of the communication device 600.

The disk 606 may optionally be replaced by any information medium such as for example a compact disk (CD-ROM), rewritable or not, a ZIP disk, a USB key or a memory card and, in general terms, by an information storage means that can be read by a microcomputer or by a microprocessor, integrated or not into the apparatus, possibly removable and adapted to store one or more programs whose execution enables a method according to the invention to be implemented.

The executable code may optionally be stored either in read only memory 607, on the hard disk 604 or on a removable digital medium such as for example a disk 606 as described previously. According to an optional variant, the executable code of the programs can be received by means of the communication network 603, via the interface 602, in order to be stored in one of the storage means of the communication device 600, such as the hard disk 604, before being executed.

The central processing unit 611 is preferably adapted to control and direct the execution of the instructions or portions of software code of the program or programs according to the invention, which instructions are stored in one of the aforementioned storage means. On powering up, the program or programs that are stored in a non-volatile memory, for example on the hard disk 604 or in the read only memory 607, are transferred into the random access memory 612, which then contains the executable code of the program or programs, as well as registers for storing the variables and parameters necessary for implementing the invention.

In a preferred embodiment, the apparatus is a programmable apparatus which uses software to implement the invention. However, alternatively, the present invention may be implemented in hardware (for example, in the form of an Application Specific Integrated Circuit or ASIC).

FIG. 7 is a block diagram schematically illustrating the architecture of a communication device or node 600, in particular one of nodes 100-107, adapted to carry out, at least partially, the invention. As illustrated, node 600 comprises a physical (PHY) layer block 703, a MAC layer block 702, and an application layer block 701.

The PHY layer block 703 (here an 802.11 standardized PHY layer) has the task of formatting frames, modulating frames on or demodulating frames from any 20 MHz channel or the composite channel, and thus sending or receiving frames over the radio medium used 100. The frames may be 802.11 frames, for instance medium access trigger frames TF 430 to define resource units in a granted transmission opportunity, MAC data and management frames based on a 20 MHz width to interact with legacy 802.11 stations, as well as of MAC data frames of OFDMA type having smaller width than 20 MHz legacy (typically 2 or 5 MHz) to/from that radio medium.

The MAC layer block or controller 702 preferably comprises a MAC 802.11 layer 704 implementing conventional 802.11ax MAC operations, and an additional block 705 for carrying out, at least partially, the invention. The MAC layer block 702 may optionally be implemented in software, which software is loaded into RAM 512 and executed by CPU 511.

Preferably, the additional block, referred to as MU EDCA mode management module 705 implements the part of the invention that regards node 600, i.e. managing the switching between the two legacy and MU EDCA modes, and handling the various timers used to control each traffic queue in the MU EDCA mode.

From the AP perspective, this MU EDCA mode management module 705 may be provided to send, to the nodes, the set of legacy values of the EDCA parameters and the set of MU values of the EDCA parameters, different from the set of legacy values, and a set of initializing values for the HEMUEDCATimers to drive the nodes entering the MU EDCA mode to remain in such mode at least the corresponding duration. These values thus drive each node in configuring itself when one of its traffic queues switches between a legacy EDCA mode in which the respective EDCA parameters are set to the legacy values and a MU EDCA mode, to be maintained during a predetermined duration initialized based on the associated initializing value and counted down by an associated timer, in which the respective EDCA parameters are set to the MU values.

MAC 802.11 layer 704 and MU EDCA mode management module 705 interact one with the other in order to provide management of the channel access module handling the queue backoff engines and a RU access module handling the RU backoff engine as described below.

On top of the Figure, application layer block 701 runs an application that generates and receives data packets, for example data packets of a video stream. Application layer block 701 represents all the stack layers above MAC layer according to ISO standardization.

Embodiments of the present invention are now illustrated using various exemplary embodiments. Although the proposed examples use the trigger frame 430 (see FIG. 4) sent by an AP for a multi-user uplink transmissions, equivalent mechanisms can be used in a centralized or in an ad-hoc environment (i.e. without an AP). It means that the operations described below with reference to the AP may be performed by any node in an ad-hoc environment.

These embodiments are mainly described in the context of IEEE 802.11ax by considering OFDMA resource units. Application of the invention is however not limited to the IEEE 802.11ax context.

Also the present invention does not necessarily rely on the usage of a MU access scheme as described in 802.11ax. Any other RU access scheme defining alternate medium access schemes allowing simultaneous access by the nodes to the same medium can also be used.

The set of MU values may be more restrictive than the set of legacy values, resulting for a traffic queue being in the MU EDCA mode to access less often the medium using EDCA contention access scheme.

However, the set of MU values may be more permissive in some embodiments.

For the sake of clarity, the explanations below focus on a set of MU values that is more restrictive. In this context, the MU EDCA mode is referred to as the "degraded" mode, while the legacy EDCA mode is referred to as "non-degraded" mode.

Figure 8:
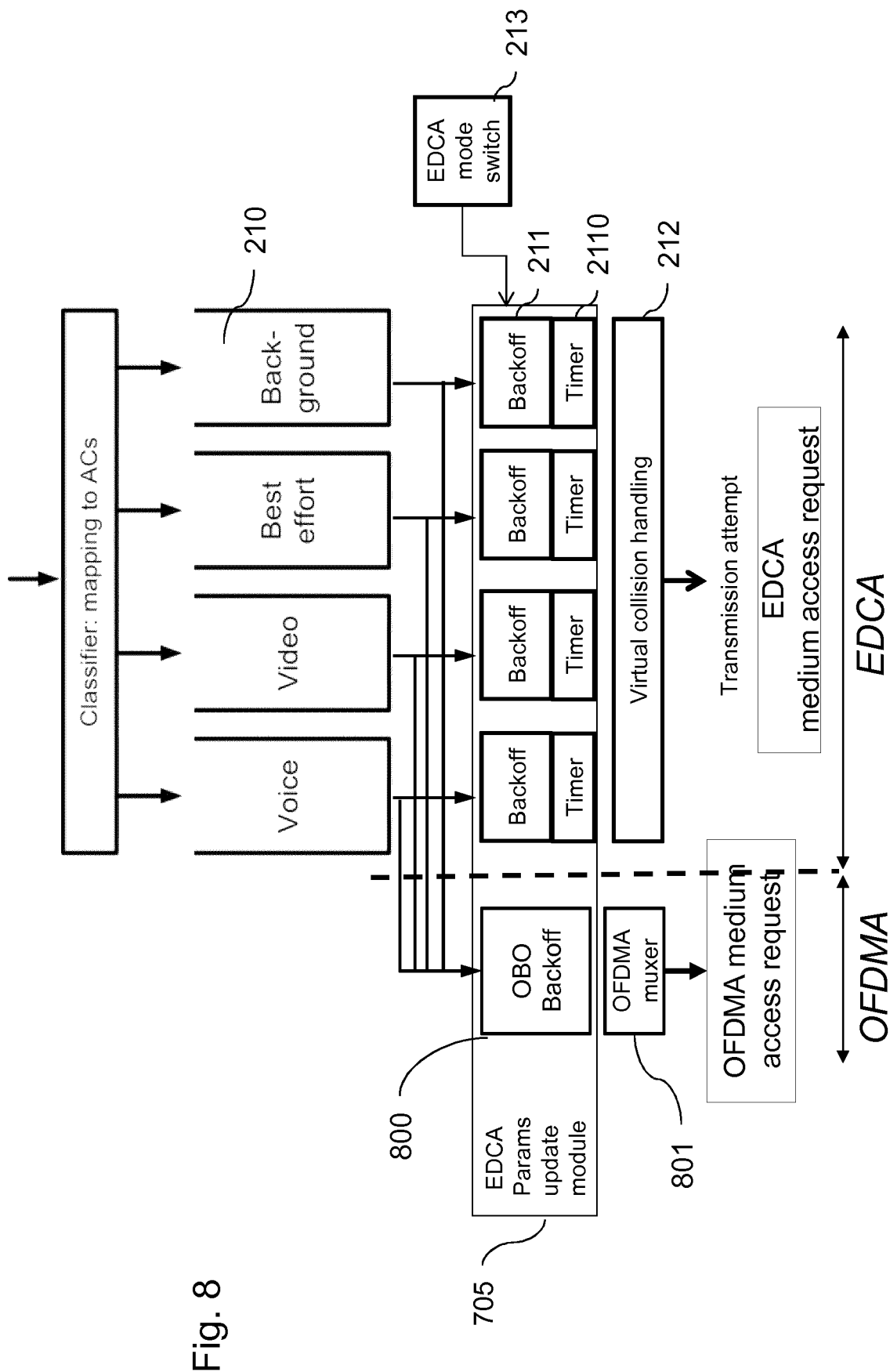
FIG. 8 illustrates an exemplary transmission block of a communication node according to embodiments of the invention.

FIG. 8 illustrates an exemplary transmission block of a communication node 600 according to embodiments of the invention.

As mentioned above, the node includes a channel access module and possibly an RU access module, both implemented in the MAC layer block 702. The channel access module includes:

- a plurality of traffic queues 210 for serving data traffic at different priorities;
- a plurality of queue backoff engines 211, each associated with a respective traffic queue for using EDCA parameters, in particular for computing a respective queue backoff value, to be used to contend for access to at least one communication channel in order to transmit data stored in the respective traffic queue. This is the EDCA access scheme.

According to embodiments of the present invention, each queue backoff engine 211 has its own HEMUEDCATimer 2110. It means the node comprises a plurality of timers, each one associated with one of the traffic queues.

Also an EDCA mode switch 213 is provided in the node that handles the switching between the degraded MU EDCA mode and the legacy EDCA mode, by updating the EDCA parameters according to the teachings of the invention. The EDCA mode switch operates responsive to each OFDMA transmission in a RU by the node.

The RU access module includes an RU backoff engine 800 separate from the queue backoff engines, for using RU contention parameters, in particular for computing an RU backoff value, to be used to contend for access to the OFDMA random resource units defined in a received TF (sent by the AP for instance), in order to transmit data stored in either traffic queue in an OFDMA RU. The RU backoff engine 800 is associated with a transmission module, referred to as OFDMA muxer 801. For example OFDMA muxer 801 is in charge, when the RU backoff value OBO described below reaches zero, of selecting data to be sent from the AC queues 210.

The conventional AC queue back-off registers 211 drive the medium access request along EDCA protocol (channel contention access scheme), while in parallel, the RU backoff engine 800 drives the medium access request onto OFDMA multi-user protocol (RU contention access scheme).

As these two contention access schemes coexist, the source node implements a medium access mechanism with collision avoidance based on a computation of backoff values:
- a queue backoff counter value corresponding to a number of time-slots the node waits (in addition to a DIFS period), after the communication medium has been detected to be idle, before accessing the medium. This is EDCA, regardless of whether it is in a degraded or non-degraded state;
- an RU backoff counter value (OBO) corresponding to a number of idle random RUs the node detects, after a TXOP has been granted to the AP or any other node over a composite channel formed of RUs, before accessing the medium. This is OFDMA. A variant to counting down the OBO based on the number of idle random RUs may be based on a time-based countdown.

Figure 9:
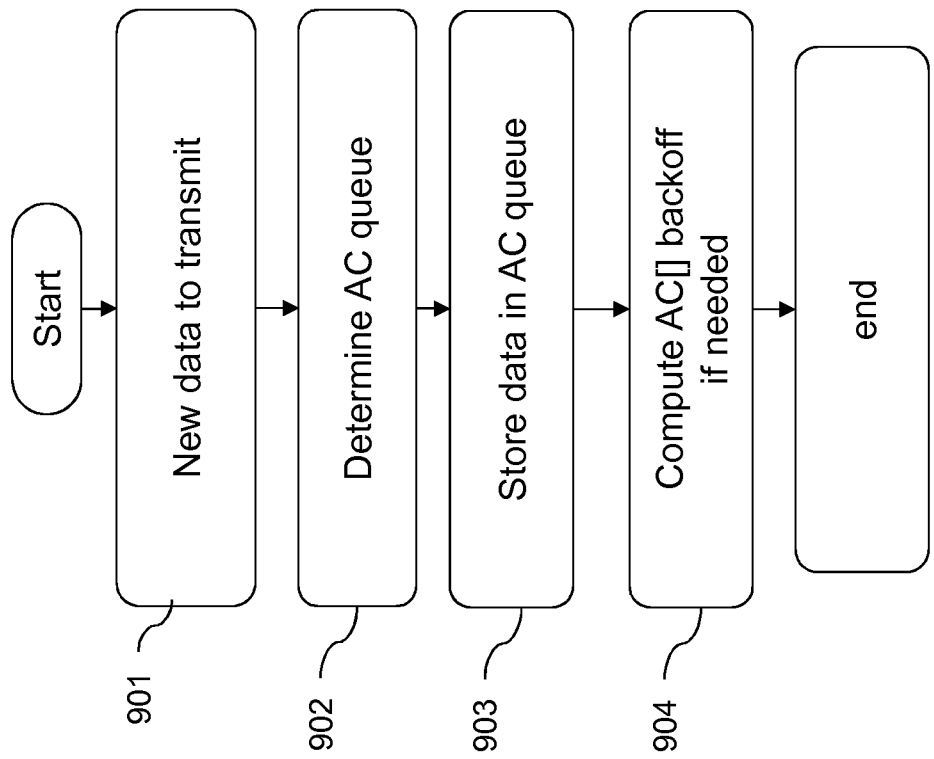
FIG. 9 illustrates, using a flowchart, main steps performed by a MAC layer of a node, when receiving new data to transmit, in embodiments of the invention.

FIG. 9 illustrates, using a flowchart, main steps performed by MAC layer 702 of node 600, when receiving new data to transmit. It illustrates a conventional FIFO feeding in 802.11 context.

At the very beginning, none traffic queue 210 stores data to transmit. As a consequence, no queue backoff value 211 has been computed. It is said that the corresponding queue backoff engine or corresponding AC (Access Category) is inactive. As soon as data are stored in a traffic queue, a queue backoff value is computed (from corresponding queue backoff parameters), and the associated queue backoff engine or AC is said to be active.

When a node has data ready to be transmitted on the medium, the data are stored in one of the AC queue 210, and the associated backoff 211 should be updated.

At step 901, new data are received from an application running on the device (from application layer 701 for instance), from another network interface, or from any other data source. The new data are ready to be sent by the node.

At step 902, the node determines in which AC queues 210 the data should be stored. This operation is usually performed by checking the TID (Traffic Identifier) value attached to the data (according to the matching shown in FIG. 3b).

Next, step 903 stores the data in the determined AC queue. It means the data are stored in the AC queue having the same data type as the data.

At step 904, conventional 802.11 AC backoff computation is performed by the queue backoff engine associated with the determined AC queue.

If the determined AC queue was empty just before the storage of step 903 (i.e. the AC is originally inactive), then there is a need to compute a new queue backoff value for the corresponding backoff counter.

The node thus computes the queue backoff value as being equal to a random value selected in range [0, CW], where CW is the current value of the CW for the Access Category considered (as defined in 802.11 standard). It is recalled here that the queue backoff value will be added to the AIFSN (which may be degraded in the MU EDCA mode) in order to implement the relative priorities of the different access categories. CW is a congestion window value that is selected from selection range [$CW_{min}$, $CW_{max}$], where both boundaries $CW_{min}$ and $CW_{max}$ (possibly degraded) depend on the Access Category considered.

As a result the AC is made active.

The above parameters CW, $CW_{min}$, $CW_{max}$, AIFSN, and Backoff value form the EDCA parameters and variables associated with each AC. They are used to set the relative priorities to access the medium for the different categories of data.

The EDCA parameters have usually a fixed value (e.g. $CW_{min}$, $CW_{max}$, and AIFSN), while the EDCA variables (CW and backoff value) evolve over time and medium availability. As readily apparent from the above, the present invention provides evolution of the EDCA parameters through the switching between degraded and non-degraded parameter values.

Also step 904 may include computing the RU backoff value OBO if needed. An RU backoff value OBO needs to be computed if the RU backoff engine 800 was inactive (for instance because there were no data in the traffic queues until previous step 903) and if new data to be addressed to the AP have been received.

The RU backoff value OBO may be computed in a similar fashion as the EDCA backoff value, i.e. using dedicated RU contention parameters, such as a dedicated contention window [0, CWO] and a selection range [$CWO_{min}$, $CWO_{max}$].

Note that some embodiments may provide distinction between data that can be sent through resource units (i.e. compatible with MU UL OFDMA transmission) and those that cannot. Such decision can be made during step 902, and a corresponding marking item can be added to the stored data.

In such a case, the RU backoff value OBO is computed only if the newly stored data are marked as compatible with MU UL OFDMA transmission.

Next to step 904, the process of FIG. 9 ends.

Once data are stored in the AC queues, the node may access the medium directly through EDCA access scheme (either with the legacy EDCA mode or with the degraded MU EDCA mode) as illustrated below with reference to FIG. 10, or through resource units provided by the AP through one or more trigger frames, as illustrated below with reference to FIG. 11.

Figure 10:
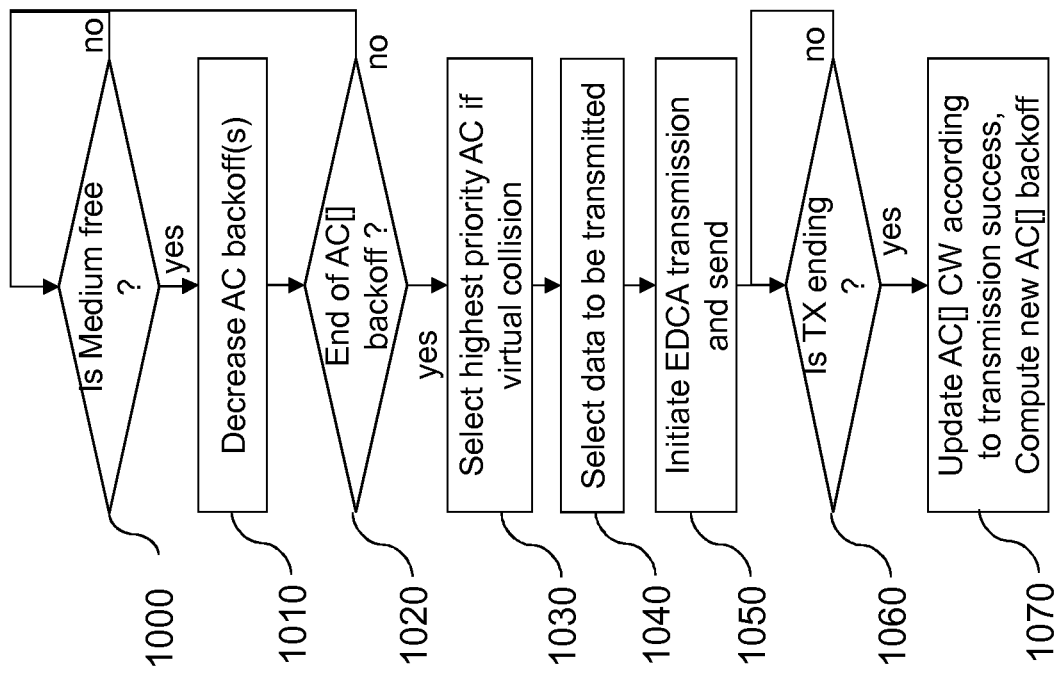
FIG. 10 illustrates, using a flowchart, steps of accessing the medium based on the EDCA medium access scheme, in both situations with non-degraded EDCA parameters or with degraded EDCA parameters, according to embodiments of the invention.

FIG. 10 illustrates, using a flowchart, steps of accessing the medium based on the (legacy or degraded MU) EDCA medium access scheme.

Steps 1000 to 1020 describe a conventional waiting introduced in the EDCA mechanism to reduce the collision on a shared wireless medium. In step 1000, node 600 senses the medium waiting for it to become available (i.e. detected energy is below a given threshold on the primary channel).

When the medium becomes free during an AIFS[i] period (including a DIFS period and the AIFSN[i] period—see FIG. 3a), step 1010 is executed in which node 600 decrements all the active (non-zero) AC[ ] queue backoff counters 211 by one. In other words, the node decrements the queue backoff values each elementary time unit the communication channel is detected as idle.

Next, at step 1020, node 600 determines if at least one of the AC backoff counters reaches zero.

If no AC queue backoff reaches zero, node 600 waits for another backoff timeslot (typically 9 μs), and thus loops back to step 1000 in order to sense the medium again during the next backoff timeslot. This makes it possible to decrement the AC backoff counters at each new backoff timeslot when the medium is sensed as idle, as soon as their respective AIFS[i] have expired.

If at least one AC queue backoff reaches zero, step 1030 is executed in which node 600 (more precisely virtual collision handler 212) selects the active AC queue having a zero queue backoff counter and having the highest priority.

At step 1040, an appropriate amount of data is selected from this selected AC for transmission, to match the bandwidth of the TXOP.

Next, at step 1050, node 600 initiates an EDCA transmission, in case for instance an RTS/CTS exchange has been successfully performed to have a TXOP granted. Node 600 thus sends the selected data on the medium, during the granted TXOP.

Next, at step 1060, node 600 determines whether or not the EDCA transmission has ended, in which case step 1070 is executed.

At step 1070, node 600 updates the contention window CW of the selected traffic queue, based on the status of transmission (positive or negative ack, or no ack received). Typically, node 600 doubles the value of CW if the transmission failed, until CW reaches the maximum value $CW_{max}$ (either degraded or not) which depends on the AC type of the data. On the other hand, if the EDCA transmission is successful, the contention window CW is set to the minimum value $CW_{min}$ (either degraded or not) which is also dependent on the AC type of the data.

Next, if the selected traffic queue is not empty after the EDCA data transmission, a new associated queue backoff counter is randomly selected from [0,CW], similar to step 904.

This ends the process of FIG. 10.

Figure 11:
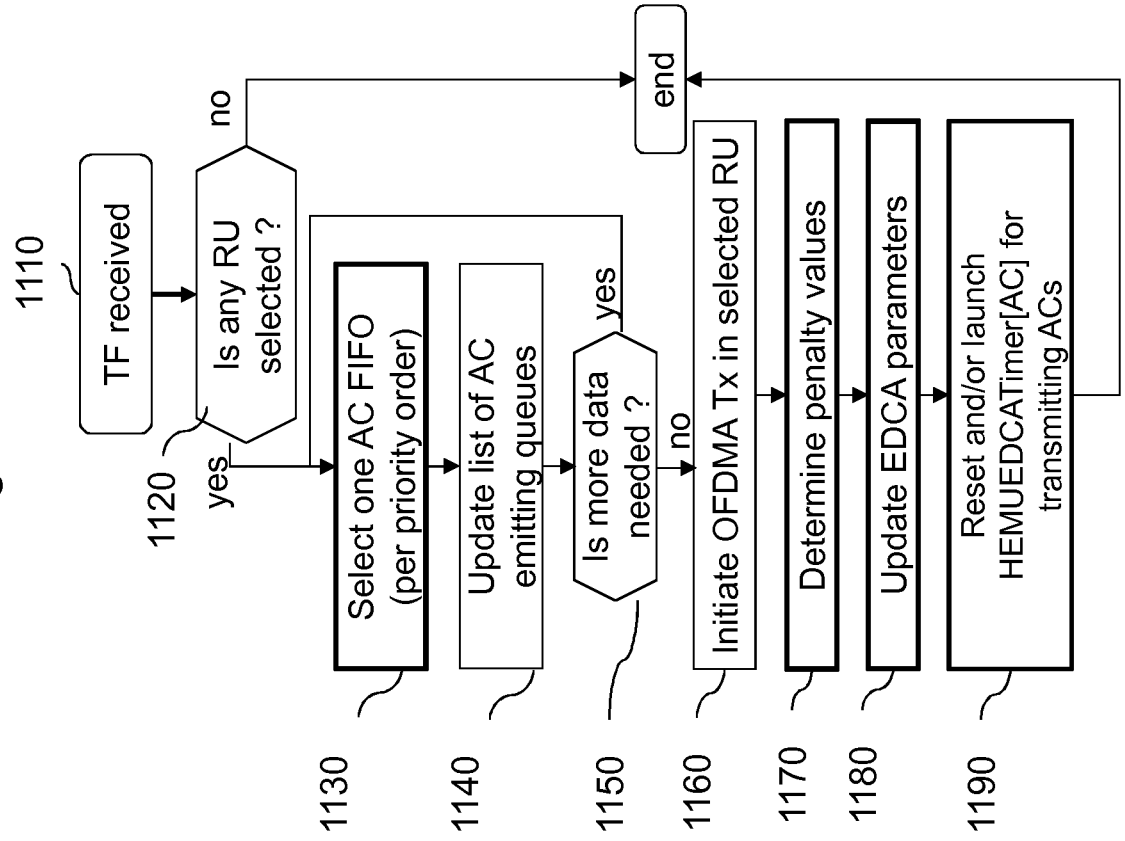
FIG. 11 illustrates, using a flowchart, steps of accessing resource units based on an RU or OFDMA access scheme upon receiving a trigger frame defining RUs according to embodiments of the invention.

FIG. 11 illustrates, using a flowchart, steps of accessing resource units based on an RU or OFDMA access scheme upon receiving a trigger frame defining RUs. For instance, this illustrates node 502's behavior in FIG. 5b.

At step 1110, the node determines whether a trigger frame is received from the access point in the communication network, the trigger frame reserving a transmission opportunity granted to the access point on the communication channel and defining resource units, RUs, forming the communication channel. If so, the node analyses the content of the received trigger frame.

At step 1120, the node determines whether or not it can transmit data over one of the RUs defined in the received trigger frame. The determination may involve one or both of two conditions, regarding in particular the type of RUs.

By analysing the content of the received TF, the node determines whether or not a defined RU is a scheduled resource unit assigned by the access point to the node. This may be done by looking for its own AID in the received TF, which AID is associated with a specific scheduled RU to be used for MU UL OFDMA transmission.

Also, by analysing the content of the received TF, the node determines whether or not one or more random RUs are defined in the TF, i.e. RUs the access of which is made through contention using dedicated RU contention parameters (including the above-mentioned OBO value 800). In that case, the node also determines whether or not its current OBO value 800 allows one random RU to be selected (for instance if OBO 800 is less than the number of random RUs in the TF).

If one scheduled RU is assigned to the node or the latter is allowed (after contention) to access one random RU, the node determines the size of the random/scheduled RU or RUs to be used and step 1130 is executed. Otherwise, the node decrements the RU backoff value OBO 800 based on the number of random resource units defined in the received trigger frame, and the process ends as the node cannot access any RU defined by the received TF.

At step 1130, the node selects at least one of the traffic queues 210 from which the data to be transmitted are selected, and adds data of the selected queue or queues to the transmission buffer until the quantity of data reaches the size of the selected resource unit to be used.

Various criteria to select a current traffic queue may be involved.

For instance, this may be done by:
selecting a traffic queue 210 having the lowest associated queue backoff value. The selection of the traffic queue thus depends on the values of the EDCA backoffs 211, thereby guaranteeing that the node respects the EDCA principle and that correct QoS is implemented for its data);

selecting randomly one non-empty traffic queue from the traffic queues;

selecting a traffic queue storing the biggest amount of data (i.e. the most loaded);

selecting a non-empty traffic queue having the highest associated traffic priority (given the AC categories shown in FIG. 3b);

selecting a non-empty traffic queue associated with a data type matching a data type associated with the resource unit over which the data to select are to be transmitted. Such specified data type may be a traffic queue indicated by the AP in the trigger frame, for instance using the Preferred AC field 1340 of FIG. 13 when the AC Preference Level field is set to 1, This is the selection criteria used in the example of FIG. 5b.

Next to step 1130, step 1140 provides that the node sets or updates a list of emitting/transmitting queues by inserting the current traffic queue from which the data selected in step 1130 come. The list keeps the order of insertion of the emitting/transmitting queues, so that for instance a primary emitting/transmitting queue (first queue selected on step 1030) and subsequent emitting/transmitting queues can be easily identified.

In addition, the node may store during step 1140 an item of information representing the amount of data thus selected from the current traffic queue, for transmission in the RU. For instance, then node updates the list of emitting queues by also inserting the quantity of data selected from the current traffic queue.

This list of emitting/transmitting queues can be implemented through a table containing for each traffic queue, the rank of the transmitting queue (which may be simplified to "primary" or "secondary" queue) and the quantity of data put in the transmission buffer.

At step 1150, the node determines whether or not the amount of data stored in the transmission buffer is enough to fill the selected resource unit.

If not, there is still room for additional data in the resource unit. Thus the process loops back to step 1130 during which another traffic queue may be selected, using the same selection criteria. In such a way, the transmission buffer is progressively filled up to reach the selected resource unit size.

One may thus note that a plurality of transmitting traffic queues of the same node may be involved during a MU UL OFDMA transmission, thereby resulting in having the plurality of queues entering the MU EDCA mode.

In a variant which avoids mixing data from two or more traffic queues (i.e. the data for the selected RU are selected from a single traffic queue), padding data may be added to entirely fill the selected RU. This is to ensure the whole RU duration has energy that can be detected by legacy nodes.

In another variant implementing a specific data aggregation rule, if the first selected traffic queue has not data enough to fully fill in the accessed resource unit, data from higher priority traffic queues may be selected.

Once, the transmission buffer is full for the selected RU, step 1160 initiates the MU UL OFMDA transmission of the data stored in the transmission buffer, to the AP. The OFDMA transmission is based on the OFDMA sub-channel and modulation defined in the received trigger frame and especially in the RU definition.

Next, once the transmission has been performed, and preferably upon successful transmission (i.e. an acknowledgment is received from the AP), step 1170 determines the new value or values to be applied to one or more EDCA parameters of the traffic queue or queues, in order to modify it or them into penalized value or values.

The transmitting queues added in the list at step 1140 thus enter the MU EDCA mode, meaning that their EDCA or "queue contention" parameter set should be modified, in particular into degraded parameter values to be determined. One or more transmitting queues may already be in the MU EDCA mode. However, the degraded parameter values are also to be determined (they may be modified by a beacon frame recently received with new degraded values).

During step 1170, the degraded parameter values are determined.

In embodiments, the degraded values of the EDCA parameters include a degraded Arbitration Inter-Frame Space Number, AIFSN, compared to non-degraded values of the EDCA parameters used for the traffic queue not set in the MU EDCA mode. In other words, the AIFSNs of the transmitting queues are set to degraded values.

In some embodiments, AIFSN is the only one parameter modified when switching into the MU EDCA mode. It means the degraded values of the EDCA parameters include the same lower boundary $CW_{min}$ and/or higher boundary $CW_{max}$ as the non-degraded values used for legacy EDCA mode, both $CW_{min}$ and $CW_{max}$ defining a selection range from which a size of the contention window is selected.

The degraded values used for this step are preferably selected in the last received Dedicated Information Element, usually forming part of a beacon frame transmitted by the AP. Thus, for a node periodically receiving a beacon frame from the access point, each beacon frame broadcasting network information about the communication network to the plurality of nodes, a received beacon frame thus includes, usually in addition to non-degraded (or legacy EDCA) values, the degraded values for the EDCA parameters of the plurality of traffic queues switching into the MU EDCA mode.

If such degraded values are not received from the AP, by-default values as described in the standard may be used.

Step 1170 also includes determining the predetermined degrading duration HEMUEDCATimer[AC] value for each transmitting traffic queue AC. This duration defines the period during which the node must remain in the MU EDCA mode for the associated degraded traffic queue. This information may also be obtained from the AP, for instance from a specific Dedicated Information Element of a received beacon frame as depicted in FIG. 14b or 14c below.

Next to step 1170, step 1180 actually replaces the current values of the EDCA parameters associated with the transmitting traffic queue(s) by the degraded values determined at step 1170.

In case parameters $CW_{min}$ and/or $CW_{max}$ have new values, the current CW of one or more traffic queues may be out-of-date. In that case, a new CW may be selected from newly defined range [$CW_{min}$, $CW_{max}$].

Next, at step 1190, the timer 2110 associated with each transmitting traffic queue 210 is initialized by the respective predetermined degrading duration HEMUEDCATimer[AC] as determined at step 1170. The timer 2110 is then launched and progressively elapses as the time goes.

Figure 12:
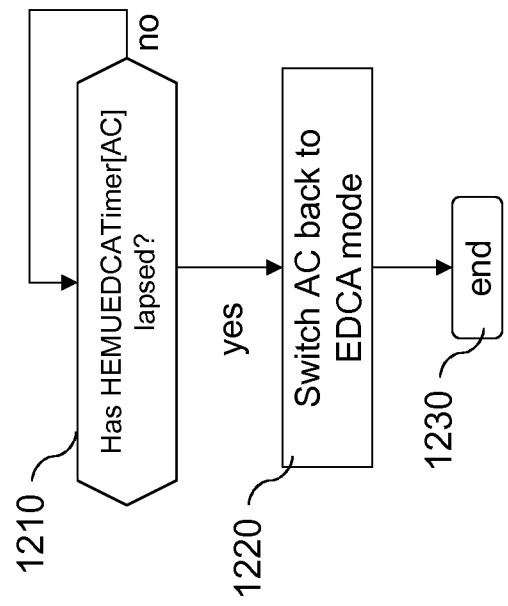
FIG. 12 illustrates, using a flowchart, the node management to switch back to the non-degraded mode, according to embodiments of the invention.

Note that if the timer was already elapsing when step 1180 is performed (meaning the associated traffic queue was already in the MU EDCA mode), the timer is reinitialized (i.e. reset) again to the HEMUEDCATimer[AC] value in order to keep the node in MU EDCA mode for a next HEMUEDCATimer[AC] period. This is the case of timer 591 in the example of FIG. 5b, FIG. 12 illustrates, using a flowchart, the node management at queue level to switch back to the non-degraded legacy mode in the examples above. This management is based on the HEMUEDCATimer[AC] dedicated to the traffic queue AC concerned. Indeed, the traffic queue AC may remain in the MU EDCA mode as long as this timer HEMUEDCATimer[AC] has not lapsed.

Thus at step 1210, it is checked whether or not HEMUEDCATimer[AC] has lapsed/expired, i.e. has reached the value 0.

In the affirmative, the traffic queue AC is switched back to the EDCA mode at step 1220. This may include resetting the EDCA parameters to non-degraded values, for instance as those provided by the AP to the nodes using the beacon frame of FIG. 14a below.

Note that due to the re-initialization of the timer at each new step 1190, the expiry of HEMUEDCATimer[AC] only occurs when no data from traffic queue AC is transmitted, from the node, in any OFDMA resource unit provided by the AP within subsequent TXOPs granted to the AP during the predetermined degrading duration.

Next, the process ends at step 1230.

The process of FIG. 12 is performed in parallel and independently for each traffic queue in the degraded MU EDCA mode (i.e. for which a timer is elapsing). This is because the timers 2110 are separate according to the teachings of the invention.

Figure 13:
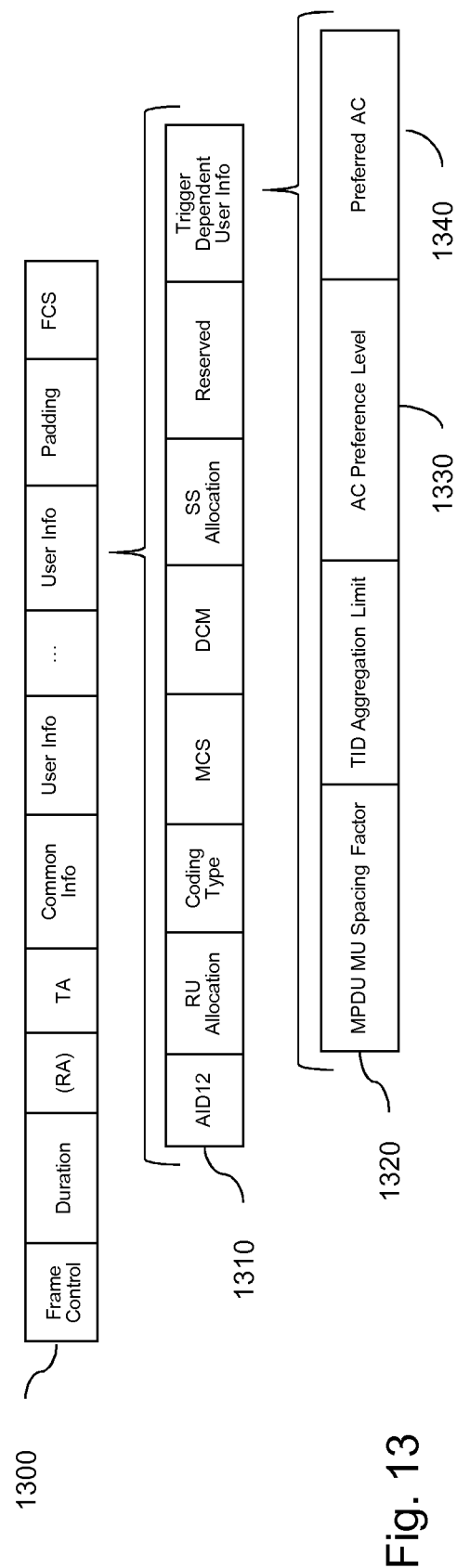
FIG. 13 illustrates the structure of a trigger frame as defined in the 802.11ax standard.

FIG. 13 illustrates the structure of a trigger frame as defined in the 802.11ax draft standard.

The trigger frame 1300 is composed of a dedicated field 1310 called User Info Field. This field contains a "Trigger dependent Common info" field 1320 which contains the "AC Preference Level" field 1330 and "Preferred AC" field 1340.

The Preferred AC field 1340 is a 2-bit field indicating the AC queue (value from 0 to 3) from which data should be sent by the node on the RU allocated to that node in the trigger frame.

The AC preference Level field 1330 is a bit indicating if the value of the Preferred AC field 1340 is meaningful or not. If the field 1340 is set to 1, then the node should take into account the preferred AC field 1340 when selecting data at step 1130. If the field 1330 is set to 0, the node is allowed to send data from any AC queue, regardless of the preferred AC field 1340 value.

The other fields of the trigger frame are defined in the 802.11ax standard.

The AP may also be in charge of broadcasting the EDCA parameters for both EDCA mode and MU EDCA mode, as well as one or more initializing values to be used to initialize or reset the timers 2110 associated with the traffic queues 210. The AP preferably performs the broadcasting using a well-known beacon frame, dedicated to configure all the nodes in an 802.11 cell. Note the if the AP fails to broadcast the EDCA parameters, the nodes are configured to fall-back to by-default values as defined in the 802.11ax standard.

Figure 14A:
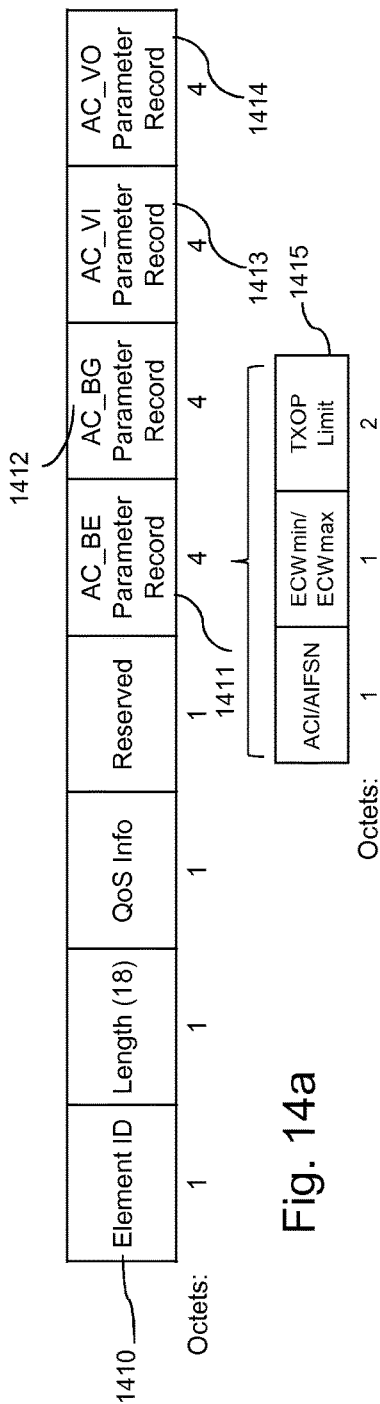
FIG. 14a illustrates the structure of a standardized information element used to describe the parameters of the EDCA in a beacon frame.
Figure 14B:
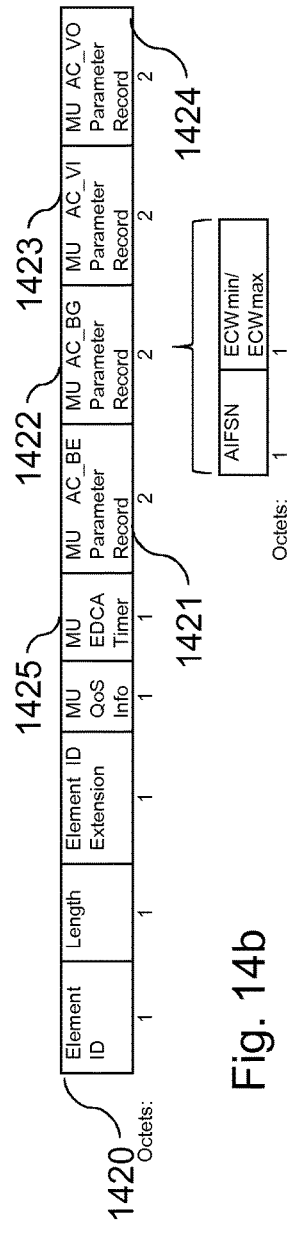
FIGS. 14b and 14c illustrate exemplary structures of a dedicated information element to transmit the degraded EDCA parameter values according to embodiments of the invention, as well as the HEMUEDCATimer value.
Figure 14C:
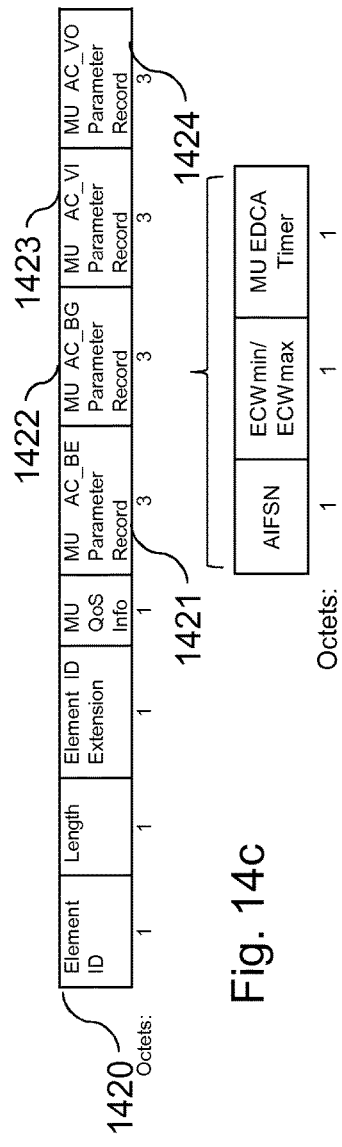

FIG. 14a illustrates the structure of a standardized information element 1410 used to describe the parameters of the EDCA in a beacon frame.

Fields 1411, 1412, 1413, 1414 describes the parameters associated with each traffic queue 210. For each traffic queue, a subfield 1415 includes the EDCA parameters: AIFSN as a delay before starting to decrease the associated backoff value, the ECWmin and ECWmax as the values of the minimum $CW_{min}$ and maximum $CW_{max}$ contention window and finally the TXOP limit as the maximum transmitting data time for an 802.11 device.

All the others fields of the information element are those described in the 802.11 standard.

FIG. 14b illustrates an exemplary structure of a dedicated information element 1420 to transmit the degraded EDCA parameter values according to the invention, as well as a common initializing value for the timers HEMUEDCATimer[AC] of all the traffic queues. The dedicated information element 1420 may be included in a beacon frame sent by the AP.

The dedicated information element 1420 includes, for each AC queue, the degraded EDCA parameters (1421, 1422, 1423, 1424) to be used by the nodes in the MU EDCA mode. It also includes a subfield 1425 specifying the common initializing value for the HEMUEDCATimers.

Each subfield 1421, 1422, 1423, 1424 includes the degraded AIFSN value for the corresponding traffic queue, as well as the degraded ECWmin value and degraded ECWmax value (they can be the same as the legacy EDCA values).

In this embodiment, the predetermined degrading durations used to initialize the timers HEMUEDCATimer[AC] associated with respective traffic queues AC are computed from the common initializing value 1425 received from the AP and from an adjusting parameter specific to each respective traffic queue.

By using different adjusting parameters, different predetermined degrading durations used to initialize the timers associated with two respective traffic queues may be obtained.

In one embodiment, the common initializing value as provided by the AP can be multiplied by a constant value (adjusting parameter) based on the priority of each traffic queue AC. For instance, the constant value can be equal to 1 for AC_VO and AC_VI access categories and equal to 3 for AC_BE and AC_BG access categories.

FIG. 14c illustrates another exemplary structure of a dedicated information element 1430 to transmit the degraded EDCA parameter values according to the invention, as well as one initializing value for each timer HEMUEDCATimer[AC] implemented by the nodes. The dedicated information element 1430 may be included in a beacon frame sent by the AP.

The dedicated information element 1430 includes, for each AC queue, a set of degraded parameters (1431, 1432, 1433, 1434) to be used by the nodes in the MU EDCA mode. It also includes a subfield 1425 specifying the common initializing value for the HEMUEDCATimers.

Each subfield 1431, 1432, 1433, 1434 includes the degraded AIFSN value for the corresponding traffic queue, as well as the degraded ECWmin value and degraded ECWmax value (they can be the same as the legacy EDCA values), and finally the initializing value to be used for HEMUEDCATimer of the traffic queue concerned.

It means that the AP is in charge of computing and then of sending a dedicated initializing value for each traffic queue. In this embodiment, the predetermined degrading durations used to initialize the timers HEMUEDCATimer [AC] associated with respective traffic queues are set to respective initializing values directly received from the AP.

To improve the QoS management, the initializing values computed by the AP are preferably based on the priority of each AC.

Although the present invention has been described hereinabove with reference to specific embodiments, the present invention is not limited to the specific embodiments, and modifications will be apparent to a skilled person in the art which lie within the scope of the present invention.

For instance, while the EDCA parameters and the degraded MU EDCA parameters are broadcasted in dedicated Information Elements of the same beacon frame in the above explanations, variations may contemplate alternating between a beacon frame sending the EDCA parameters and another beacon frame broadcasting the degraded MU EDCA parameters.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A communication device, comprising:
   a transmitting unit configured to transmit data in an enhanced distributed channel access (EDCA), transmission opportunity (TXOP), using contention parameters;
   a receiving unit configured to receive, from an access point, a beacon frame including a plurality of values for Multi-User enhanced distributed channel access timer (MUEDCATimer) which respectively correspond to a plurality of access categories (ACs), defined by IEEE802.11 series standards; and
   a controlling unit configured to control the transmitting unit, in a case where data of a predetermined access category (AC) included in the plurality of ACs is successfully transmitted over a resource unit that is defined by IEEE802.11 series standards and is provided by the access point, so that first parameters are used as the contention parameters for a predetermined duration that is based on a value, among the received plurality of values, which corresponds to the predetermined AC, and the contention parameters are set back to second parameters different from the first parameters upon expiring the predetermined duration.

2. The communication device of claim 1, further comprising a plurality of timers which respectively correspond to the plurality of ACs.

3. The communication device of claim 1, wherein the resource unit is allocated by a trigger frame transmitted from the access point.

4. The communication device of claim 1, wherein the first parameters are included in the beacon frame transmitted from the access point.

5. The communication device of claim 1, wherein the contention parameters include at least CWmin which indicates lower boundary of a contention window (CW), and CWmax which indicates higher boundary of the CW.

6. The communication device of claim 1, wherein the received plurality of values include at least a first value corresponding to a first AC and a second value corresponding to a second AC, and a duration based on the first value is different from a duration based on the second value.

7. The communication device of claim 1, further comprising a communication unit for communicating a Request-To-Send (RTS) frame or a Clear-To-Send (CTS) frame.

8. An access point, comprising:
a transmitting unit configured to transmit, to a communication device, a beacon frame including a plurality of values for Multi-User enhanced distributed channel access timer (MUEDCATimer) which respectively correspond to a plurality of access categories (ACs), defined by IEEE802.11 series standards; and
a receiving unit configured to receive data from the communication device which, in a case where data of a predetermined access category (AC) included in the plurality of ACs is successfully transmitted over a resource unit that is defined by IEEE802.11 series standards and is provided by the access point, uses first parameters as contention parameters for a predetermined duration that is based on a value, among the plurality of values, which corresponds to the predetermined AC, and sets the contention parameters back to second parameters different from the first parameters upon expiring the predetermined duration.

9. The access point of claim 8, wherein the resource unit is allocated by a trigger frame transmitted from the access point.

10. The access point of claim 8, wherein the first parameters are included in the beacon frame transmitted from the access point.

11. The access point of claim 8, wherein the contention parameters include at least CWmin which indicates lower boundary of a contention window (CW), and CWmax which indicates higher boundary of the CW.

12. The access point of claim 8, wherein the plurality of values include at least a first value corresponding to a first AC and a second value corresponding to a second AC, and a duration based on the first value is different from a duration base on the second value.

13. The access point of claim 8, further comprising a communication unit for communicating a Request-To-Send (RTS) frame or a Clear-To-Send (CTS) frame.

14. A method for a communication device, comprising:
transmitting data in an enhanced distributed channel access (EDCA), transmission opportunity (TXOP), using contention parameters;
receiving, from an access point, a beacon frame including a plurality of values for Multi-User enhanced distributed channel access timer (MUEDCATimer) which respectively correspond to a plurality of access categories (ACs), defined by IEEE802.11 series standards; and
controlling the transmission, in a case where data of a predetermined AC access category (AC) included in the plurality of ACs is successfully transmitted over a resource unit that is defined by IEEE802.11 series standards and is provided by the access point, so that first parameters are used as the contention parameters for a predetermined duration that is based on a value, among the received plurality of values, which corresponds to the predetermined AC, and the contention parameters are set back to second parameters different from the first parameters upon expiring the predetermined duration.

15. A method for an access point, comprising:
transmitting, to a communication device, a beacon frame including a plurality of values for Multi-User enhanced distributed channel access timer (MUEDCATimer) which respectively correspond to a plurality of access categories (ACs), defined by IEEE802.11 series standards; and
receiving data from the communication device which, in a case where data of a predetermined AC access category (AC) included in the plurality of ACs is successfully transmitted over a resource unit that is defined by IEEE802.11 series standards and is provided by the access point, uses first parameters as contention parameters for a predetermined duration that is based on a value, among the plurality of values, which corresponds to the predetermined AC, and sets the contention parameters back to second parameters different from the first parameters upon expiring the predetermined duration.

16. A non-transitory computer-readable medium storing a program which, when executed by a microprocessor or computer system in a communication device, causes the communication device to perform a method, the method comprising:
transmitting data in an enhanced distributed channel access (EDCA), transmission opportunity (TXOP), using contention parameters;
receiving, from an access point, a beacon frame including a plurality of values for Multi-User enhanced distributed channel access timer (MUEDCATimer) which respectively correspond to a plurality of access categories (ACs), defined by IEEE802.11 series standards; and
controlling the transmission, in a case where data of a predetermined AC access category (AC) included in the plurality of ACs is successfully transmitted over a resource unit that is defined by IEEE802.11 series standards and is provided by the access point, so that first parameters are used as the contention parameters for a predetermined duration that is based on a value, among the received plurality of values, which corresponds to the predetermined AC, and the contention parameters are set back to second parameters different from the first parameters upon expiring the predetermined duration.

17. A non-transitory computer-readable medium storing a program which, when executed by a microprocessor or computer system in an access point, causes the access point to perform a method, the method comprising:
transmitting, to a communication device, a beacon frame including a plurality of values for Multi-User enhanced distributed channel access timer (MUEDCATimer) which respectively correspond to a plurality of access categories (ACs), defined by IEEE802.11 series standards; and
receiving data from the communication device which, in a case where data of a predetermined access category (AC) included in the plurality of ACs is successfully transmitted over a resource unit that is defined by IEEE802.11 series standards and is provided by the access point, uses first parameters as contention parameters for a predetermined duration that is based on a value, among the plurality of values, which corresponds to the predetermined AC, and sets the contention parameters back to second parameters different from the first parameters upon expiring the predetermined duration.

\* \* \* \* \*